(12) United States Patent
Oka et al.

(10) Patent No.: US 7,538,313 B2
(45) Date of Patent: May 26, 2009

(54) OPTICAL ENCODER HAVING A NO TRACK PORTION OF AN OPTICAL SCALE BEING PLACED AT A POSITION SYMMETRICAL TO A LIGHT NON-TRANSPARENT PORTION WITHIN AN IRRADIATION REGION OF INCIDENT LIGHT

(75) Inventors: Toru Oka, Tokyo (JP); Yoichi Ohmura, Tokyo (JP); Hajime Nakajima, Tokyo (JP); Masahiko Sakamoto, Tokyo (JP); Toshikazu Kitagaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 77 days.

(21) Appl. No.: 11/854,635

(22) Filed: Sep. 13, 2007

(65) Prior Publication Data
US 2008/0277569 A1 Nov. 13, 2008

Related U.S. Application Data

(62) Division of application No. 10/555,101, filed as application No. PCT/JP2004/012067 on Aug. 23, 2004, now Pat. No. 7,285,769.

(30) Foreign Application Priority Data
Nov. 20, 2003 (JP) ............................... 2003-391219

(51) Int. Cl.
*G01D 5/34* (2006.01)
(52) U.S. Cl. .................................. 250/231.13; 250/239
(58) Field of Classification Search ................
250/231.13–231.18, 237 G, 237 R, 239;
341/11, 13

See application file for complete search history.

(56) References Cited

U.S. PATENT DOCUMENTS 3,598,493 A 8/1971 Fisher (Continued)

FOREIGN PATENT DOCUMENTS

JP 49-42215 Y 11/1974

(Continued)

*Primary Examiner*—Que T Le
(74) *Attorney, Agent, or Firm*—Leydig, Voit & Mayer, Ltd.

(57) ABSTRACT

In an optical encoder comprising an optical scale in which a light transmission portion and a light non-transparent portion are arranged and an output pattern obtained by emitting an incident light functions as an optical code, a light source portion and a light detecting portion, the light non-transparent portion is constituted of at least one pair of inclined surfaces which are opposed in such a manner as to become farther away from each other towards the side where the incident light enters and set so that an incident angle of the optical axis of the incident light from the light source should not be smaller than a critical angle of incidence, and the light non-transparent portion is constructed so that the incident light which enters one inclined surface should be totally reflected thereon to enter the other inclined surface and then at least part of the incident light should be reflected on the other inclined surface, and a reflected light which is reflected on the other inclined surface should not enter a light emitting portion of the light source and a reflecting portion around the light emitting portion.

1 Claim, 13 Drawing Sheets

U.S. PATENT DOCUMENTS

| | | |
|---|---|---|
| 4,820,918 A | 4/1989 | Igaki et al. |
| 4,956,553 A * | 9/1990 | Matsui .................. 250/237 G |
| 5,534,693 A | 7/1996 | Kondo et al. |
| 6,232,593 B1 | 5/2001 | Taniguchi et al. |

FOREIGN PATENT DOCUMENTS

| | | |
|---|---|---|
| JP | 60-140119 A | 7/1985 |
| JP | 62-5131 A | 1/1987 |
| JP | 64-41819 A | 2/1989 |
| JP | 2-618 U | 1/1990 |
| JP | 2-161311 A | 6/1990 |
| JP | 11-287671 A | 10/1999 |
| JP | 2003-315101 A | 11/2003 |

* cited by examiner

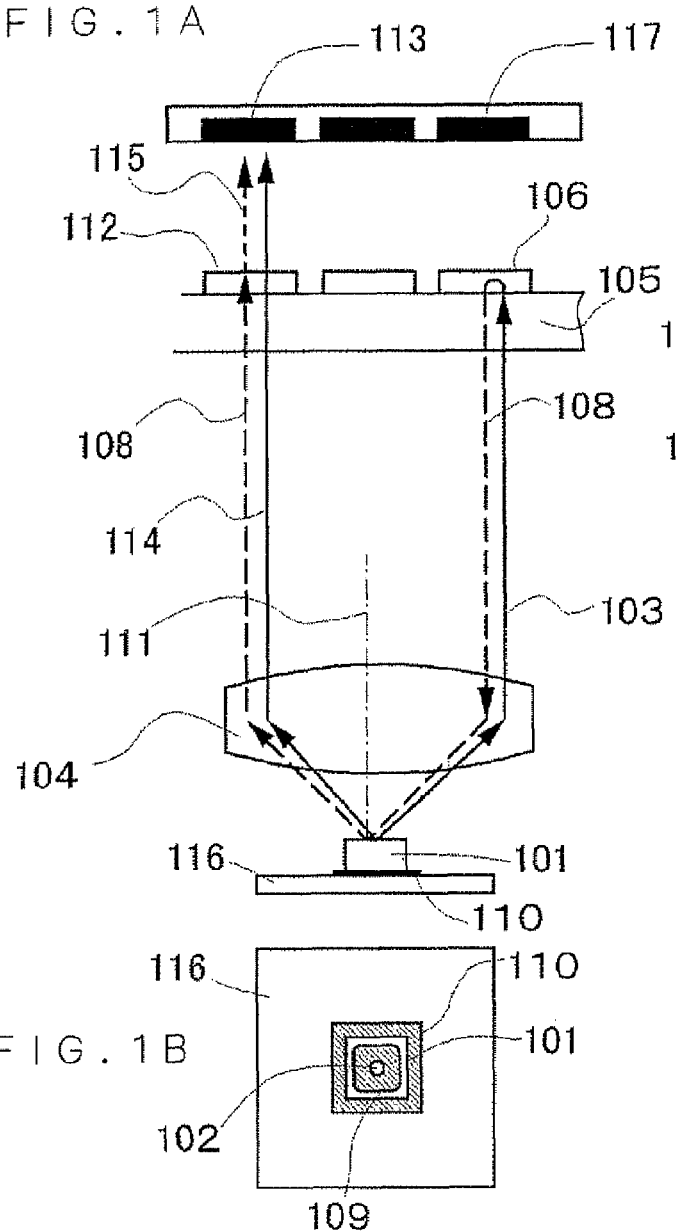
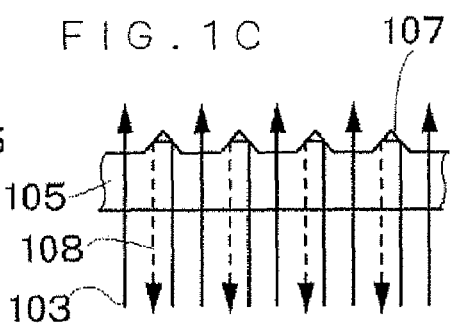
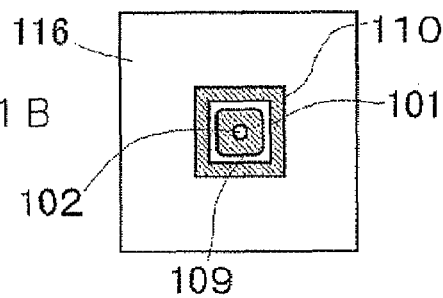

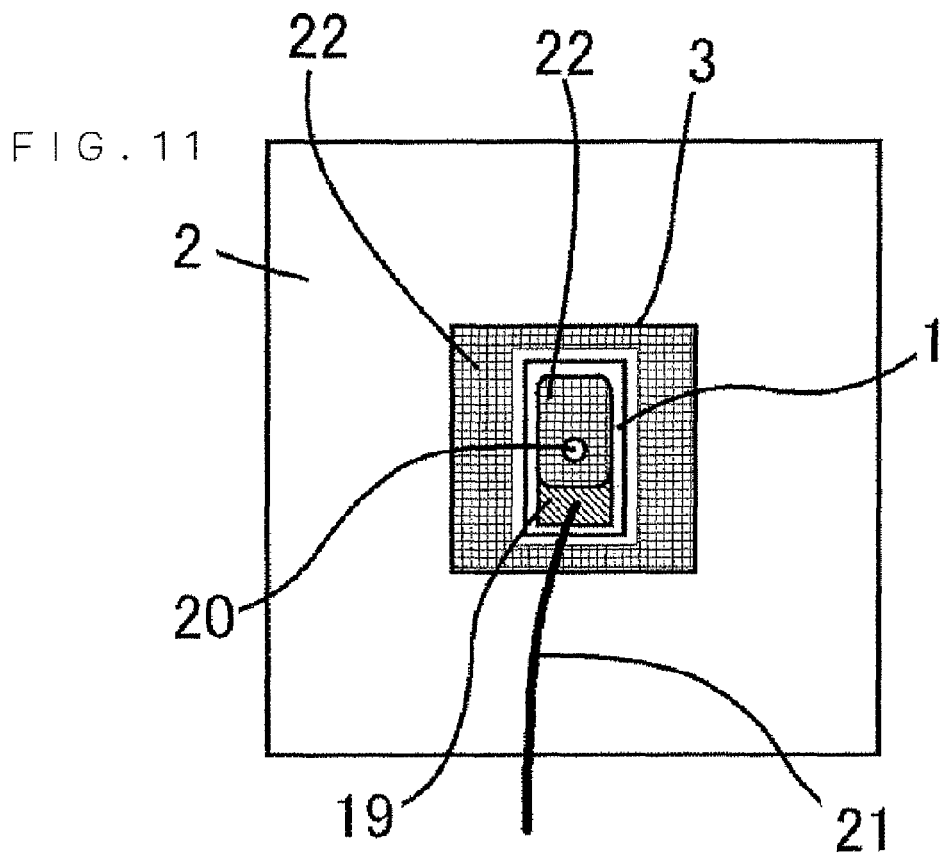
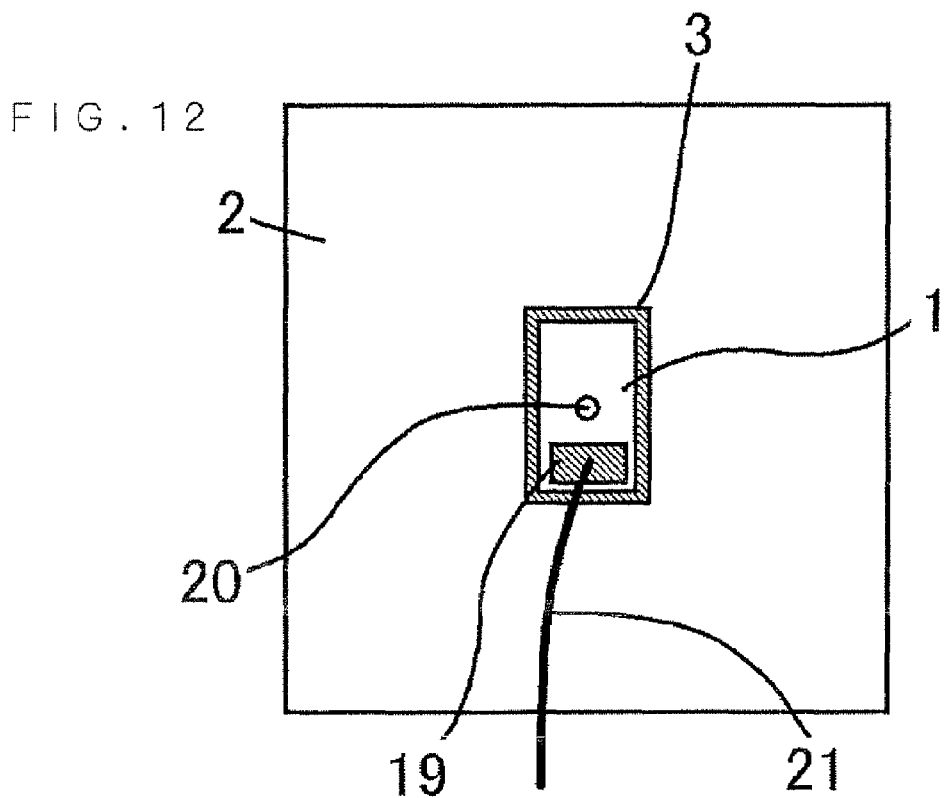

OPTICAL ENCODER HAVING A NO TRACK PORTION OF AN OPTICAL SCALE BEING PLACED AT A POSITION SYMMETRICAL TO A LIGHT NON-TRANSPARENT PORTION WITHIN AN IRRADIATION REGION OF INCIDENT LIGHT

TECHNICAL FIELD

The present invention relates to an optical encoder comprising an optical scale, and more particularly to reduction of detection error.

BACKGROUND ART

An optical encoder, generally, detects a rotation angle of an rotation axis, a rotation speed and a position and a speed of a linearly-moving object by emitting parallel beams of light from a light source to an optical scale having light transmission portions and light nontransparent portions which are alternately arranged, converting the light into a modulation signal and further converting the modulation signal into an electrical signal with a light detecting element.

An exemplary optical encoder of the background art having a purpose of lower cost and higher precision is disclosed in, for example, Patent Document 1. In Patent Document 1, it is described that a conventional technique has a problem of high cost since an optical scale is manufactured through pattern formation "by chromium evaporation of a glass plate and etching of the chromium layer to make a transparent portion and an opaque portion", and in order to solve this problem, a light shielding portion (a light non-transparent portion) is provided by additionally forming an inclined portion between light transmission portions by e.g., resin molding so that an incident angle of an incident ray of light is not smaller than a critical angle and the light shielding portions and the light transmission portions are alternately arranged to make an optical scale like a slit row made by chromium evaporation, which achieves lower cost through resin molding. In description on FIG. 2 showing one preferred embodiment of Patent Document 1, it is discussed that "it is set that the critical angle is 45 degrees or less, the angle made by extensions of inclined surfaces such as 10a and 10b which constitute one convex portion of an optical grating is 90 degrees, an incident angle of light entering the inclined surfaces 10a and 10b is 45 degrees and an incident angle of light entering flat surfaces such as 9a and 9b is 0 degree", and "the incident light on the inclined surface 10a which has an incident angle of 45 degrees is totally reflected by 90 degrees to enter the other inclined surface 10b at the angle of 45 degrees and then is totally reflected thereon by 90 degrees, going back to the incident side."

Among other background-art cases are Patent Documents 2 and 3.

Patent Document 2, for example, shows an optical scale in which light transmission portions and light non-transparent portions each of which is constituted of inclined surfaces which are set so that an incident angle of an incident light is not smaller than a critical angle are alternately arranged on a surface of a transparent member formed of polycarbonate, and it is discussed in the document that since a range of incident angle of total reflection is wide when a polycarbonate is used, even if the incident light obliquely enters the optical scale, there is high probability that the light should be totally reflected to go back to the former side and therefore it is unlikely to cause stray light.

In Patent Document 3, it is discussed that an optical path changing function has a shape with projections or depressions which are sufficiently smaller as compared with the thickness of a movable code plate and at least one shape with projections or depressions is formed in at least one of the aforementioned regions, and providing a plurality of structures with projections or depressions suppress the thickness of the structures with projections or depressions.

Patent Document 1: Japanese Patent Application Laid Open Gazette No. 60-140119 (pp. 1 to 2, FIGS. 1 and 2)

Patent Document 2: Japanese Patent Application Laid Open Gazette No. 62-5131 (p. 1 to 3, FIGS. 1 to 3, and 5)

Patent Document 3: Japanese Patent Application Laid Open Gazette No. 11-287671 (page 4, FIGS. 1 to 3)

DISCLOSURE OF INVENTION

Problem To Be Solved By the Invention

Since the background-art optical encoder is constructed as above, there is the following problem.

In a case where light which enters the light shielding portion of the optical scale in which adjacent inclined surfaces make an angle of 90 degrees is totally reflected and goes back to the incident side, light loss caused by the reflection should be ideally zero and the direction of reflection should be completely parallel with an incident light vector. In other words, this reflected light reversely traces an incident light locus and reaches the light source. Since the angle made by the above-discussed inclined surfaces, however, is slightly out of 90 degrees in many cases, depending on molding precision, there is high probability that the reflected light which reaches the light source enters a portion which can optically function as a reflection film such as an electrode or a die pad of a light source element. When a reflected ray of light from the light shielding portion in the optical scale enters the reflection film, the reflected light is further reflected with the normal of the reflection film which is drawn from the incident position as a symmetry axis.

Usually, an optical scale consists of a plurality of tracks and light beams emitted from the light source are converted into substantially parallel rays of light by a lens or the like and applied to a plurality of tracks. In other words, the light source is placed at the substantial center of the width occupied by a plurality of tracks.

Therefore, the ray of light reflected on the scale light shielding portion in one track (temporally, referred to as "a first track") is further reflected on the reflection film and enters another track (temporally, referred to as "a second track") present at a symmetrical position with respect to the normal of the reflection film.

Since the amount of light of the beam incident on the symmetrical position is modulated depending on a scale pattern of the first track, the light modulated in the first track is superimposed on a light detecting element which originally receives a transmission light modulated by the optical scale in the second track. At this time, a modulation signal of the reflected light from the first track is an antiphase of a modulation signal of the transmission light through the first track. The modulation signal of the reflected light from the first track causes an error of detection in the second track.

The same phenomenon as above occurs on the reflected light from the scale light shielding portion in the second track and this causes an error of detection in the first track.

Even in the case where there is only one track, likewise, the reflected light from the track sometimes causes a detection error.

As discussed above, in the optical scale comprising a light shielding portion in which adjacent inclined surfaces make an angle of 90 degrees, part of light beams entering the optical scale, which enters the light shielding portion, becomes a reflected light, going the way reverse to the incident direction, and the incident direction and the reflection direction are almost parallel with each other.

If the optical axis of the incident light is almost perpendicular to the optical scale, the same applies to an optical scale having a transparent portion (which corresponds to the light transmission portion) and an opaque portion (which corresponds to the light shielding portion) which are formed on a transparent substrate such as a glass by chromium evaporation and etching. In other words, when part of light beams incident on one track is reflected on the light shielding portion vapor-deposited with chromium to enter an electrode or a die pad around the light emitting point and is further reflected thereon, there is a possibility that the light enters another track to cause a detection error like in the above background-art case.

Patent Documents 1 to 3 do neither disclose nor suggest that the reflected light from the light shielding portion (light non-transparent portion) should cause an error as discussed above.

The present invention is intended to solve the above conventional problem and it is an object of the present invention to provide an optical encoder capable of suppressing a detection error caused by reentrance of a ray of light reflected on a light non-transparent portion of an optical scale into an other track or an original track.

Means for Solving the Problem

According to an aspect of the present invention, an optical encoder includes an optical scale in which a light transmission portion formed of a flat surface and a light non-transparent portion formed of inclined surfaces are arranged and an output pattern obtained by emitting an incident light functions as an optical code, a light source portion including at least one light source for emitting the incident light, and a light detecting portion including at least one light detecting element for detecting the output pattern, and in the optical encoder, the light non-transparent portion is constituted of at least one pair of inclined surfaces which are opposed in such a manner as to become farther away from each other towards the side where the incident light enters and set so that an incident angle of the optical axis of the incident light from the light source is not smaller than a critical angle of incidence, and the light non-transparent portion is constructed so that the incident light which enters one of the inclined surfaces is totally reflected thereon to enter the other inclined surface and then at least part of the incident light is reflected on the other inclined surface, and a reflected light which is reflected on the other inclined surface does not enter a light emitting portion of the light source and a reflecting portion around the light emitting portion.

According to another aspect of the present invention, an optical encoder includes an optical scale in which a light transmission portion and a light non-transparent portion are arranged and an output pattern obtained by emitting an incident light functions as an optical code, a light source portion including at least one light source for emitting the incident light, and a light detecting portion including at least one light detecting portion for detecting the output pattern, and in the optical encoder, a reflecting portion around a light emitting portion in the light source is covered with an anti-reflection film.

According to still another aspect of the present invention, an optical encoder includes an optical scale in which a light transmission portion and a light non-transparent portion are arranged and an output pattern obtained by emitting an incident light functions as an optical code, a light source portion including at least one light source for emitting the incident light, and a light detecting portion including at least one light detecting element for receiving the output pattern, and in the optical encoder, the light source is joined onto a die pad on a substrate and an area of the die pad is almost equal to an area of contact between the die pad and the light source.

According to yet another aspect of the present invention, an optical encoder includes an optical scale having at least one track in which a light transmission portion and a light non-transparent portion are arranged, where an output pattern obtained by emitting an incident light functions as an optical code, a light source portion including at least one light source for emitting the incident light, and a light detecting portion including at least one light detecting element for receiving the output pattern, and in the optical encoder, a portion of the optical scale which has no track is placed at a position symmetrical to the light non-transparent portion within an irradiation region of the incident light from the light source with respect to an optical axis of the light source as a symmetry axis.

Effects of the Invention

In the present invention, since the light non-transparent portion is constituted of at least one pair of inclined surfaces which are opposed in such a manner as to become farther away from each other towards the side where the incident light enters and set so that the incident angle of the optical axis of the incident light from the light source is not smaller than the critical angle of incidence, and the light non-transparent portion is constructed so that the incident light which enters one of the inclined surfaces is totally reflected thereon to enter the other inclined surface and then at least part of the incident light is reflected on the other inclined surface, and the reflected light which is reflected on the other inclined surface does not enter the light emitting portion of the light source and the reflecting portion around the light emitting portion, the reflected light from the light non-transparent portion in one track on the optical scale does not enter the reflecting portion around the light emitting portion in the light source but is absorbed or scattered therein, and therefore the reflected light hardly reenters an other track nor the original track. As a result, it is possible to suppress an error caused by reentrance of the ray of light reflected on the light non-transparent portion into an other track or the original track.

Further, since the reflecting portion around the light emitting portion in the light source is covered with the anti-reflection film, even if a reflected light from the light non-transparent portion in one track on the optical scale enters the reflecting portion around the light emitting portion in the light source, the reflected light is absorbed by the anti-reflection film and therefore the reflected light hardly reenters an other track or the original track. As a result, it is possible to suppress an error caused by reentrance of the ray of light reflected on the light non-transparent portion into an other track or the original track.

Furthermore, since the light source is joined onto the die pad on the substrate and the area of the die pad is almost equal to the area of contact between the die pad and the light source, the probability that a reflected light from the light non-transparent portion in one track on the optical scale should enter the die pad serving as the reflecting portion around light emitting portion in the light source becomes lower and the reflected light hardly reenters an other track or the original track. As a result, it is possible to suppress an error caused by reentrance of the ray of light reflected on the light non-transparent portion into an other track or the original track.

Moreover, since a portion of the optical scale which has no track is placed at a position symmetrical to the light non-transparent portion within the irradiation region of the incident light from the light source with respect to the optical axis of the light source as a symmetry axis, even if the incident light from the light source is reflected on the light non-transparent portion to become a reflected light and is reflected again on the reflecting portion around light emitting portion in the light source to enter the optical scale again, the reflected light hardly reenters an other track or the original track. As a result, it is possible to suppress an error caused by reentrance of the ray of light reflected on the light non-transparent portion into an other track or the original track.

BRIEF DESCRIPTION OF DRAWINGS

FIGS. 1A, 1B and 1C show a typical construction of a background-art optical encoder, and FIG. 1A is a cross section showing the optical encoder taken along a plane including tracks, FIG. 1B is a plan view showing a light source portion and FIG. 1C is a cross section showing an optical scale taken along a plane perpendicular to the section of FIG. 1A;

FIG. 2A is a cross section showing the whole construction and FIG. 2B is an enlarged cross section showing part of the construction shown in FIG. 2A;

FIG. 3A is a plan view viewed from a light detecting portion and FIG. 3B is an enlarged plan view showing part of the construction shown in FIG. 3A;

FIG. 4A is a plan view viewed from the light detecting portion and FIG. 4B is an enlarged plan view showing part of the construction shown in FIG. 4A;

FIG. 5A is a plan view viewed from the light detecting portion and FIG. 5B is an enlarged plan view showing part of the construction shown in FIG. 5A;

FIG. 6A is a cross section showing the whole construction and FIG. 6B is an enlarged cross section showing part of the construction shown in FIG. 6A;

FIG. 7A is a cross section showing the whole construction and FIG. 7B is an enlarged cross section showing part of the construction shown in FIG. 7A;

FIG. 9A is a cross section showing the whole construction and FIG. 9B is an enlarged cross section showing part of the construction shown in FIG. 9A;

FIG. 10A is a cross section showing the whole construction and FIG. 10B is an enlarged cross section showing part of the construction shown in FIG. 10A;

FIG. 11 is a plan view showing a principal part of an optical encoder in accordance with an eighth preferred embodiment of the present invention;

FIG. 12 is a plan view showing a principal part of an optical encoder in accordance with a ninth preferred embodiment of the present invention;

FIG. 14A is a plan view viewed from the light detecting portion and FIG. 14B is an enlarged plan view showing part of the construction shown in FIG. 14A.

Figure 2A:
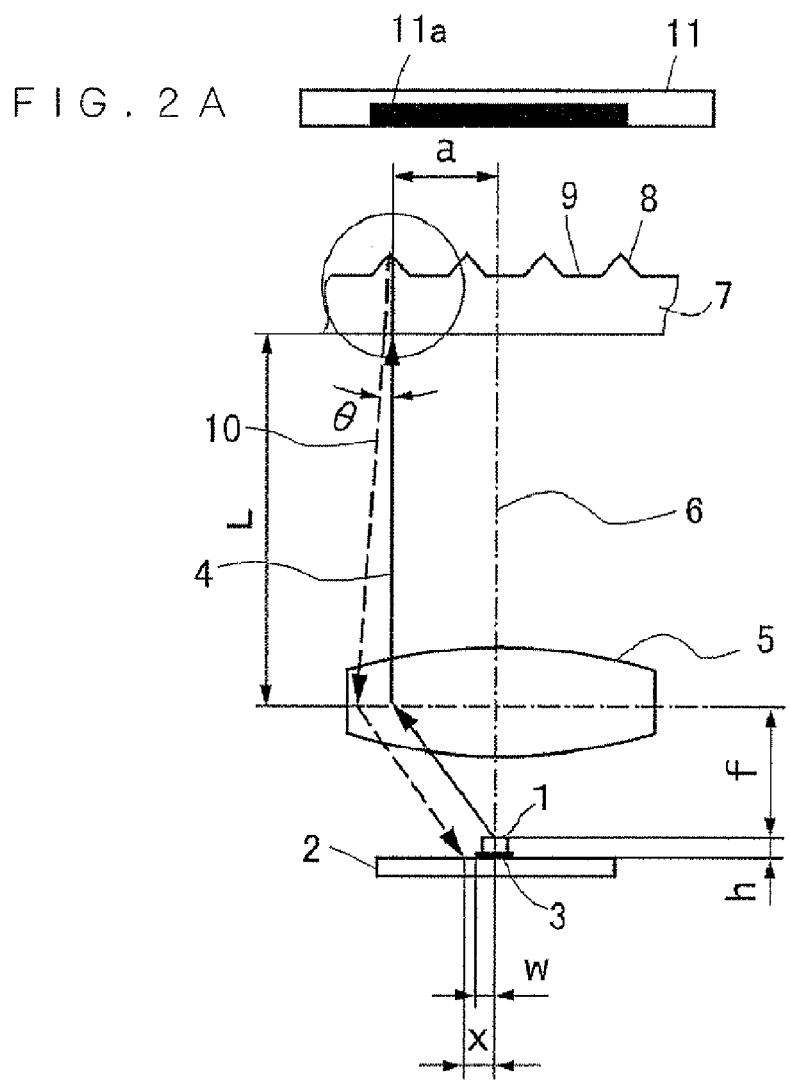
FIGS. 2A and 2B show a construction of an optical encoder in accordance with a first preferred embodiment of the present invention.

DESCRIPTION OF REFERENCE SIGNS 1, 101 light source, 2, 116 substrate, 3, 110 die pad, 4, 103 incident light, 5, 104 lens, 6 optical axis of outgoing light from the light source 1, 7 optical scale, 8, 12, 107 V-shaped projection, 13 trapezoidal projection, 8a, 8b, 12a, 12b, 13a, 13b inclined surface, 9 flat portion, 10, 108 reflected light, 11 light detecting portion, 11a light detecting element, 14, 15, 113, 117 track, 19, 109 electrode, 20, 102 light emitting point, 21 metal wire, 22 anti-reflection film

BEST MODE FOR CARRYING OUT THE INVENTION

The First Preferred Embodiment

Prior to discussion on the preferred embodiment, first, discussion will be made on an error caused by reentrance of a ray of light reflected on the light non-transparent portion in the optical scale into an other track or the original track in the background-art optical encoder shown in Patent Documents 1 to 3, referring to figures. FIGS. 1A, 1B and 1C show a typical construction of the above background-art optical encoder, and more specifically, FIG. 1A is a cross section showing the optical encoder taken along a plane including tracks, FIG. 1B is a plan view showing a light source portion, which is viewed from the side of the optical scale and FIG. 1C is a cross section showing the optical scale taken along a plane perpendicular to the section of FIG. 1A.

As shown in FIGS. 1A and 1B, a ray of light 103 emitted from a light emitting point 102 of a light emitting element (light source) 101 such as an LED provided on a substrate 116 is changed into one of parallel beams by a lens 104 and enters a track 106 constituted of light transmission portions and light shielding portions (light non-transparent portions) in an optical scale 105. As shown in FIG. 1C, the track 106 is constituted of V-shaped projections 107 (which correspond to inclined surfaces serving as the light non-transparent portions) and flat portions (which correspond to flat surfaces serving as the light transmission portions) and the design value of a vertex angle of the V-shaped projection 107 is 90 degrees. The refractive index of the optical scale 105 is selected so that the critical angle which depends on the difference in refractive index between it and a peripheral portion such as air should be 45 degrees or less.

Since part of the rays of light (incident light) 103 entering the track 106, which enters the V-shaped projection 107, enters a slope (inclined surface) of the V-shaped projection at an angle of 45 degrees, the light is totally reflected twice on the slope of the V-shaped projection 107 to become a reflected light 108, going the way reverse to the incident direction. The reflected light 108 is refracted by the lens 104 to go back to the light emitting element 101 again.

Usually, the vertex angle of the V-shaped projection 107 is slightly out of the design value of 90 degrees or the incident angle of the ray of light 103 into the V-shaped projection 107 is slightly out of 45 degrees in many cases due to manufacturing error, and therefore part of or most of the reflected light 108 does not go back to the light emitting point 102 but enters an electrode 109 or a die pad 110 therearound. Though discussion will be made herein on a case where the reflected light 108 enters the electrode 109, the same phenomenon occurs also in the case where the reflected light 108 enters the die pad 110. In FIG. 1B, for easy understanding, the electrode 109 and the die pad 110 are hatched.

Since a metal is generally used as a material of the electrode 109 and its reflectance is high, the reflected light 108 is reflected again with a normal 111 of the electrode 109 extending from the incident point on the electrode 109 as a symmetry axis. After that, the reflected light 108 enters the lens 104 and is refracted thereby, and further enters a track 112 other than the track 106. Since the track 112 is also constituted of the light transmission portions and the light shielding portions, part of the reflected light 108 passes through the light transmission portions in the track 112 and is received by a light detecting element 113 provided on a side (the upper side of the optical scale 105 in FIG. 1A opposite to the light source 1 in the optical scale 105.

It is designed that the light passing through the track 106 should be changed into a modulation signal through a certain intensity modulation by using an arrangement pattern of the light transmission portions and the light shielding portions. On the other hand, the reflected light 108 is subjected to modulation in phase opposite to the above modulation signal. Therefore, a ray of light 114, which is emitted from the light emitting element 101 and changed into one of parallel beams by the lens 104 to pass through the light transmission portion in the track 112, directly enters the light detecting element 113, and a ray of light 115, which is part of the reflected light 108 modulated in the track 106 to be opposite in phase to the light passing through the track 106 and passes through the track 112, also enters the light detecting element 113. In other words, when the optical scale 105 moves in a direction perpendicular to the paper in FIG. 1A, the light detecting element 113 outputs a signal in which an output to be originally detected which reflects an arrangement pattern of the light transmission portions in the track 112 and an output which reflects an arrangement pattern of the light shielding portions in the track 106 are superimposed to each other, and therefore a detection error occurs.

Naturally, however, since the reflected light from the light shielding portion in the track 112 enters the track 106 through the electrode 109 or the die pad 110, an output from a light detecting element 117 includes a detection error.

Figure 2B:
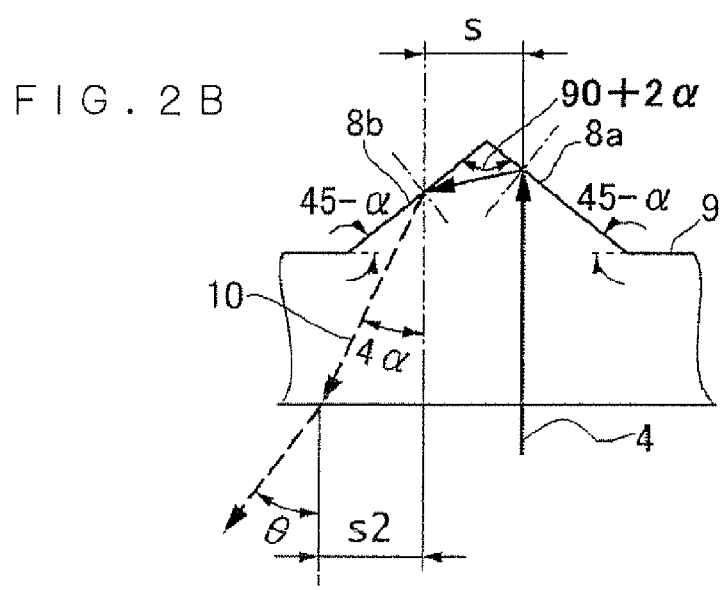
Figure 3A:
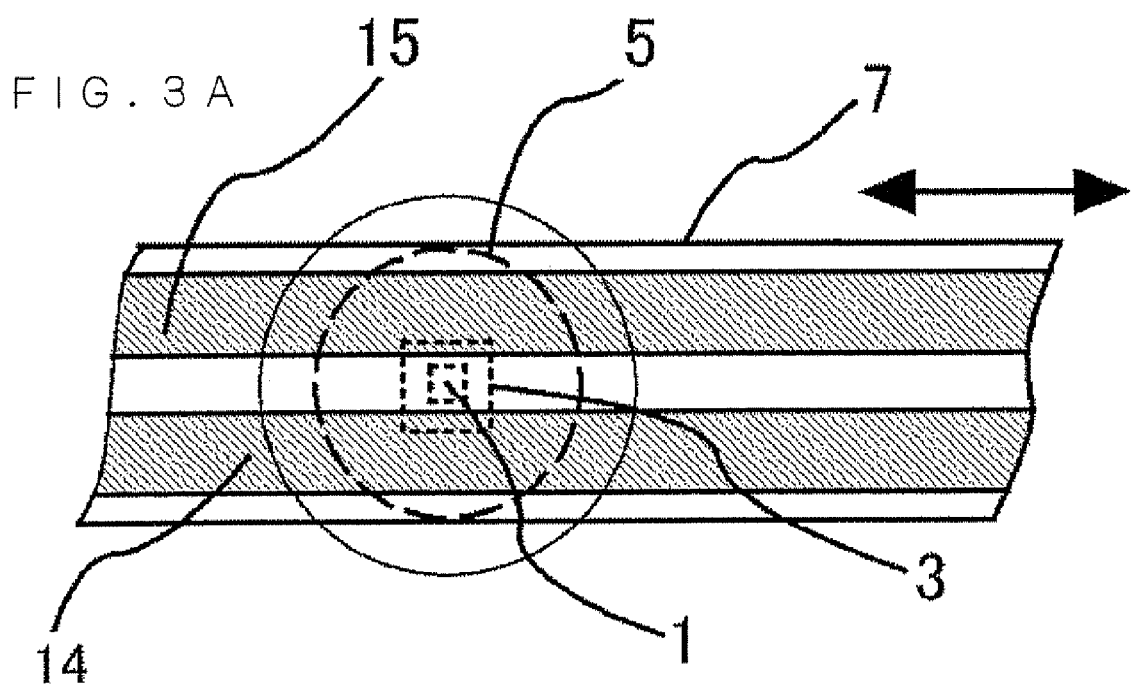
FIGS. 3A and 3B show the optical encoder in accordance with the first preferred embodiment of the present invention.
Figure 3B:
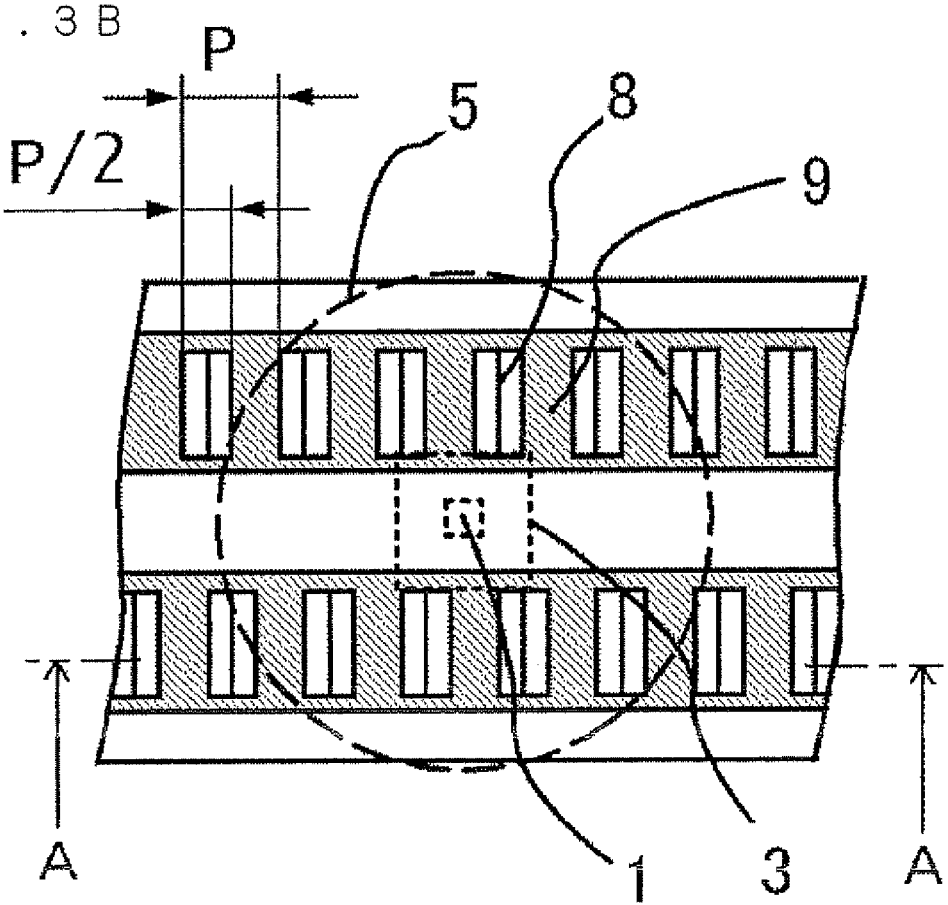

FIGS. 2A, 2B and 3A, 3B each show a construction of an optical encoder in accordance with the first preferred embodiment of the present invention, and FIG. 2A is a cross section showing the whole construction, FIG. 2B is an enlarged cross section showing the vicinity of the V-shaped projection (surrounded by a circle) in FIG. 2A, FIG. 3A is a plan view viewed from a light detecting portion and FIG. 3B is an enlarged plan view showing part (surrounded by a circle) of the construction shown in FIG. 3A. FIG. 2A shows a section taken along the line A-A of FIG. 3B.

A light source 1, such as an LED, is placed on a die pad 3 provided on a substrate 2. As a material of the die pad 3, like that of the electrode, a metal is generally used and its reflectance is high. The substrate 2 having a surface in which light is absorbed or scattered and very few light is regularly reflected. A light ray (incident light) 4 emitted from the light source 1 is so refracted by a lens 5 as to be almost parallel with an optical axis 6. After being refracted by the lens 5, the light ray 4 enters an optical scale 7.

As shown in FIGS. 3A and 3B, the optical scale 7 is constituted of a plurality of tracks 14 and 15 (hatched in FIGS. 3A and 3B) and in each of the tracks 14 and 15, a plurality of V-shaped projections 8 are aligned with a period of P and a width of P/2. FIGS. 3A and 3B show a linear type scale as an example. The optical scale 7 moves in a direction indicated by the arrow of FIG. 3A relatively to the light source 1, the die pad 3 and the lens 5.

The optical scale 7 is constituted of V-shaped projections 8 (each of which corresponds to a light non-transparent portion consisting of at least one pair of inclined surfaces which are opposed in such a manner as to become farther away from each other towards the side where the incident light 4 enters) and flat portions 9 (each of which corresponds to a light transmission portion formed of a flat surface), and a tilt angle of inclined surfaces 8a and 8b of the V-shaped projection 8 is $(45-\alpha)$ degrees with respect to the flat portion 9 (flat surface) as shown in FIG. 21B, where $0<\alpha<45$. An angle made by the inclined surfaces 8a and 8b is $(90+2\alpha)$ degrees, i.e., $(90+\gamma)$ degrees, where $0<\gamma<90$.

The refractive index of the optical scale 7 is selected so that a critical angle $\theta c$ which depends on the difference in refractive index between it and a peripheral portion such as air should be smaller than $(45-\alpha)$ degrees. In other words, the light non-transparent portion is constituted of at least one pair of inclined surfaces 8a and 8b which are opposed in such a manner as to become farther away from each other towards the side where the incident light 4 enters (the lower side in FIG. 2B) and set so that an incident angle of the optical axis 6 of the incident light 4 from the light source 1 is not smaller than the critical angle. Therefore, since the light ray 4 entering the V-shaped projection 8 is totally reflected, the light ray 4 does not enter the light detecting element 11a and only the ray of light entering the flat portion 9 and passing therethrough enters the light detecting element 11a in the light detecting portion 11 and detected therein.

Herein, the ratio in width between the flat portion 9 and the V-shaped projection 8 is not particularly specified and the width of the flat portion 9 is zero in some cases. The light detecting element 11a is not limited to a single element but may consist of a plurality of elements.

FIG. 2A shows a case where the light ray 4 going on the left side of the optical axis 6 enters the right slope (the inclined surface on the right side) 8a of the V-shaped projection 8. If the traveling direction of the light ray 4 is parallel with the optical axis 6, since the incident angle is $(45-\alpha)$ degrees, the light ray 4 is totally reflected and enters the left slope (the inclined surface on the left side) 8b. Since the incident angle of the light entering the left inclined surface 8b is $(45+3\alpha)$ degrees, the light ray is totally reflected to become a reflected light 10. In this case, the angle made by the traveling direction of the reflected light 10 and the optical axis 6 is $4\alpha$. Since the angle made by the inclined surfaces 8a and 8b is $(90+2\alpha)$ degrees, in other words, out of 90 degrees, the reflected light 10 is not parallel with the incident light 4.

The reflected light 10 is refracted at a boundary between the optical scale 7 and the peripheral portion and after the angle made by the optical axis 6 and the reflected light 10 becomes θ, the reflected light 10 is refracted by the lens 5 and reaches the light source portion (substrate 2), but in the optical scale of the first preferred embodiment, α is set so that the reflected light 10 should enter the substrate 2 at a position outside the die pad 3 (the reflected light 10 should not enter the light emitting portion and a reflecting portion such as the die pad 3 or the electrode around the light emitting portion in the light source 1), in other words, $$x > w \quad (1)$$

should be satisfied, where x represents a distance between the incident position of the reflected light 10 onto the substrate 2 and the light emitting point of the light source 1 and w represents a distance between an end of the die pad 3 and the light emitting point of the light source 1.

Though it is assumed in the first preferred embodiment that the substrate 2 has a surface in which light is absorbed or scattered and very few light is regularly reflected, however, if the substrate 2 has a high rate of regular reflection like the die pad 3, the above reference sign w represents a distance between an end of a region having a high rate of regular reflection and the light emitting point of the light source 1 instead.

In the first preferred embodiment, x can be expressed as:

$$x = \left(\frac{-ah}{f}\right) + \left(f - \frac{Lh}{f} + h\right) \times \tan(\theta) \quad (2)$$

$$\theta = \sin^{-1}(n\sin(4\alpha)) \quad (3)$$

where f represents a focal length of the lens 5, h represents a thickness of the light source 1, a represents a distance between the incident position of the light ray 4 onto the optical scale 7 and the optical axis 6, L represents a distance between a principal plane of the lens and a lower surface of the optical scale 7 and n represents the refractive index of the optical scale 7. Herein, it is assumed that a distance s between the light ray 4 and a reflection point of the reflected light 10 on the left inclined surface 8b, a distance s2 between the reflection point of the reflected light 10 on the left inclined surface 8b and an intersection between the reflected light 10 and the lower surface of the optical scale 7 and the aberration of the lens 5 are all negligible. Further, the outside of the optical scale 7 is assumed to be air having a refractive index of 1.

When tan θ=θ, sin θ=θ, sin(4α)=4α, from Eqs. (1), (2) and (3), $$\alpha > \frac{wf + ah}{4n(f^2 + hf - Lh)} \text{ (rad)} \quad (4)$$

When w=0.5 mm, f=5 mm, h=0.25 mm, a=2 mm, L=5 mm and n=1.5, for example, Eq. (4) is calculated as:

$$\alpha > 0.02(rad) \approx 1.15(deg)$$

In the first preferred embodiment, α is set so that Eq. (4) should be satisfied for a which represents the incident position of the light ray 4 with respect to the optical scale 7 in all the cases or most cases. If a takes a value ranging from −2 mm to +2 mm, the right side of Eq. (4) takes the maximum value when a=+2 mm, where it is assumed that the left direction of FIGS. 2A and 2B is + (positive) with respect to a and other variables are scalar (positive values having no direction). In the first preferred embodiment, α is set not smaller than 1.15 (deg) as above.

Further, the critical angle θ c of the optical scale 7 is smaller than (45−α) degrees (θ c<45−α) as discussed above. In other words, from $$\alpha < 45 - \theta c (deg) \quad (5)$$

and n=1.5, α<3.19 (deg) is satisfied.

Though x and a are expressed by Eqs. (2) and (4), respectively, in the first preferred embodiment, the expressions are naturally changed when the constitution of the optical system is changed.

It is preferable that the value of the above reference sign α should be 3 degrees or less regardless of the critical angle θ c of the optical scale 7. This is intended to reduce the probability that the light ray 4 reflected on the right inclined surface 8a might not enter the left inclined surface 8b and go to an unexpected direction, being a stray light.

As discussed above, in the first preferred embodiment, since it is constructed so that the incident light 4 entering one inclined surface 8a should be totally reflected thereon to enter the other inclined surface 8b and then should be totally reflected on the other inclined surface 8b and the reflected light 10 reflected on the other inclined surface 8b should not enter the light emitting portion and the reflecting portion (such as the electrode of the light source 1 (light emitting element) or the die pad 3) around the light emitting portion in the light source 1, and the light ray 10 reflected on the light non-transparent portion (V-shaped projection 8) in one track (e.g., the track 14) on the optical scale 7 does not enter the reflecting portion such as the electrode or the die pad 3 in the light source 1 but is absorbed or scattered therein, the light ray 10 hardly enters the other track (e.g., the track 15) or the original track (e.g., the track 14). As a result, it is possible to suppress a detection error caused by reentrance of the light ray reflected on the light non-transparent portion (the V-shaped projection 8) into the other track or the original track.

The above discussion has been made on the case where it is constructed so that the incident light 4 entering one inclined surface 8a should be totally reflected to enter the other inclined surface 8b and should be further totally reflected on the other inclined surface 8b. Besides the above effect, such a construction produces an effect that since the incident light is surely reflected totally on the light non-transparent portion (the inclined surfaces 8a and 8b) without being leaked on the side where the light detecting element 11a is placed, it is possible to suppress the stray light which is a cause of error. Not only in the case where the incident light is totally reflected on the other inclined surface 8b, however, but also in the case where at least part of the incident light is reflected on the other inclined surface 8b, similarly, with the construction where the reflected light 10 reflected on the other inclined surface 8b should not enter the light emitting portion and the reflecting portion (the electrode of the light source 1 (light emitting element) and the die pad 3) around the light emitting portion in the light source 1, it is possible to suppress a detection error caused by the light ray reflected on the light non-transparent portion (the V-shaped projection 8).

In a case where the light ray 4 enters the optical scale 7, being inclined at an angle of φ with respect to the optical axis 6, in other words, in a case where an angle made by the normal of the flat surface (the flat portion 9) and the optical axis 6 of the incident light 4 from the light source 1 is φ, Eq. (3) is changed as follows, where with respect to φ, the counterclockwise direction is positive with the optical axis 6 as a reference in FIG. 2A and the others are scalar like in Eq. (3). The following equation can be naturally applied to a case where the light ray 4 enters in parallel with the optical axis 6 by setting that φ=0.

$$\theta = |\sin^{-1}(n \sin(4\alpha - \phi))| \qquad (3a)$$

Further, in all the cases or most cases of a representing the incident position of the light ray 4, α is set as follows:

$$(-45 + \theta c + \phi)/3 < \alpha < 45 - \theta c + \phi \, (deg) \qquad (5a)$$

If φ≦4 α, in other words, α≧φ/4 is satisfied, α is set so that the conditional expression obtained by substituting Eq. (3a) into Eqs. (2) and (1) and 0<α<45 as well as Eq. (5a) should be satisfied.

If φ>4α, in other words, α<φ/4 is satisfied, α is set so that the conditional expression obtained by substituting Eq. (3a) into Eqs. (6) and (1) and 0<α<45 as well as Eq. (5a) should be satisfied.

Though the above discussion has been made on the case where the light ray 4 going on the left side of the optical axis 6 enters the right inclined surface 8a of the V-shaped projection 8, if the light ray 4 going on the right side of the optical axis 6 enters the left inclined surface 8b of the V-shaped projection 8, the phenomenon symmetrical to the above case occurs.

Though the above discussion has been made on the case where the optical scale 7 is a linear type as shown in FIGS. 3A and 3B, the optical scale 7 is not limited to this type but may be a rotary type as shown in FIGS. 4A, 4B and 5A, 5B and this case also produces the same effect.

Figure 4A:
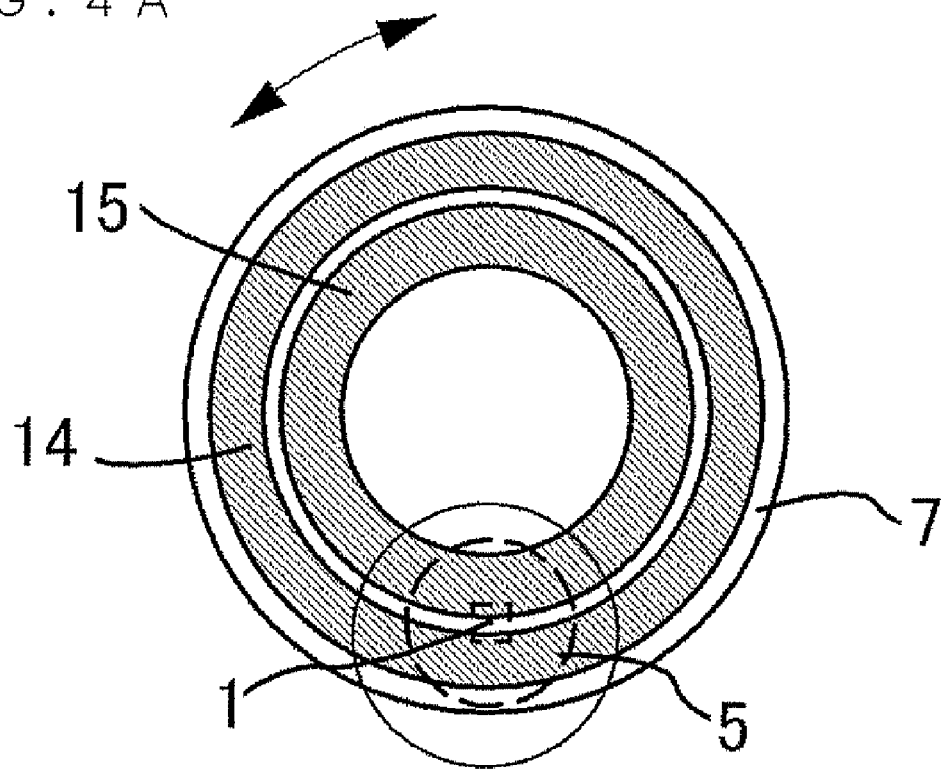
FIGS. 4A and 4B show another construction of the optical encoder in accordance with the first preferred embodiment of the present invention.
Figure 4B:
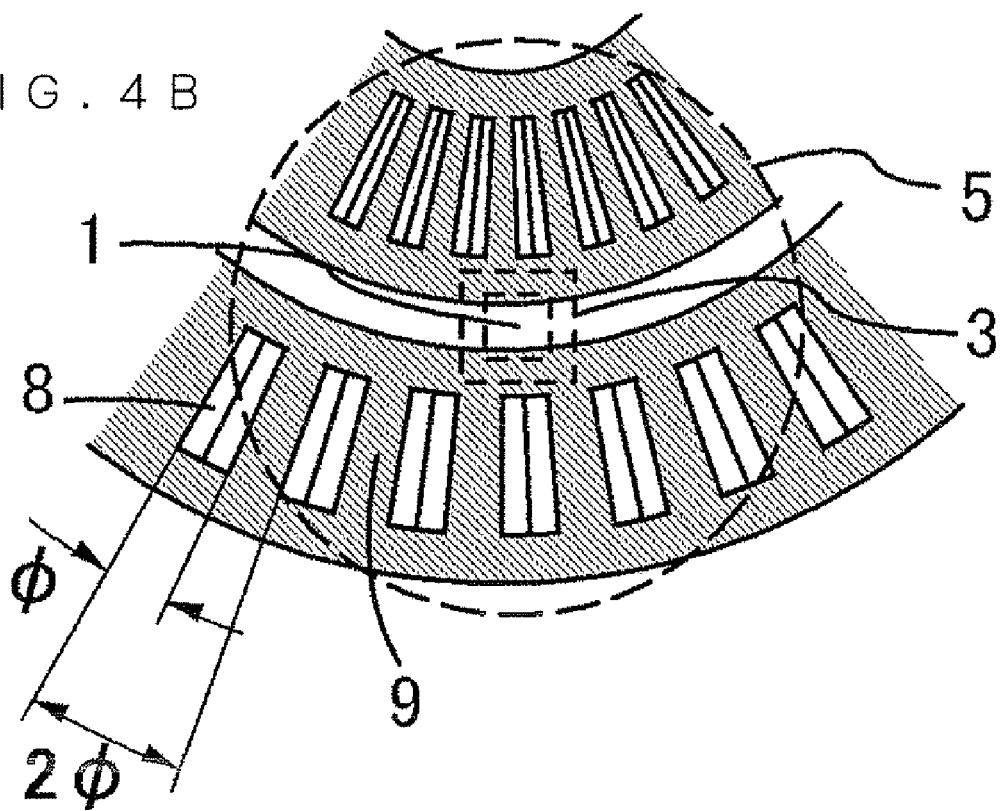
Figure 5A:
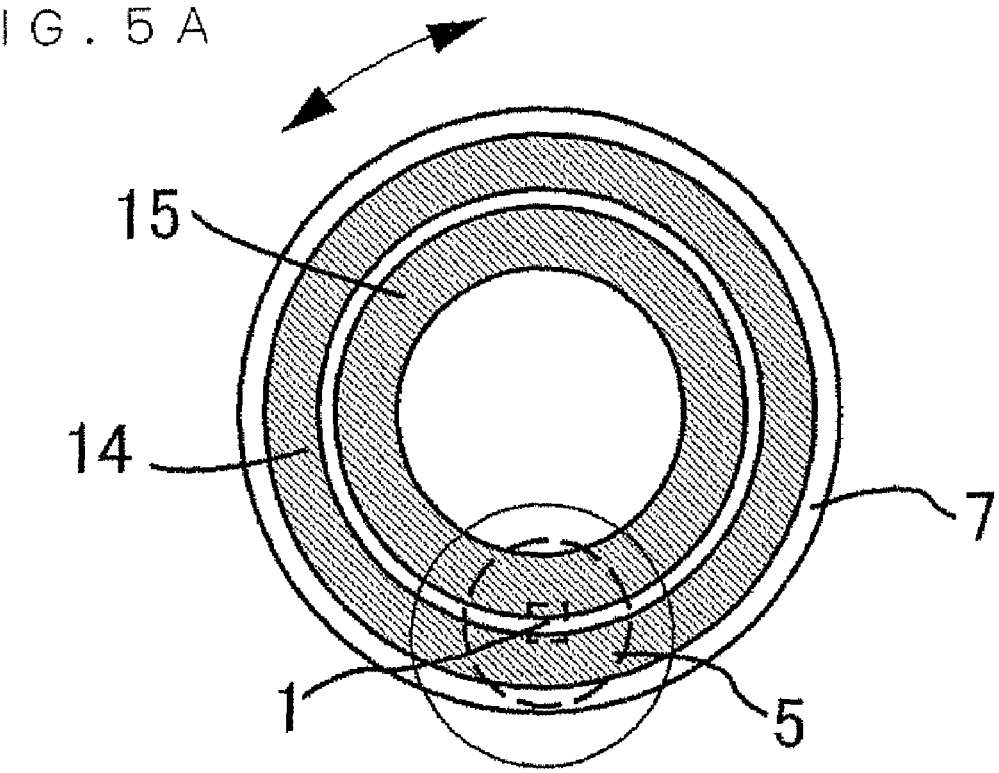
FIGS. 5A and 5B show still another construction of the optical encoder in accordance with the first preferred embodiment of the present invention.
Figure 5B:
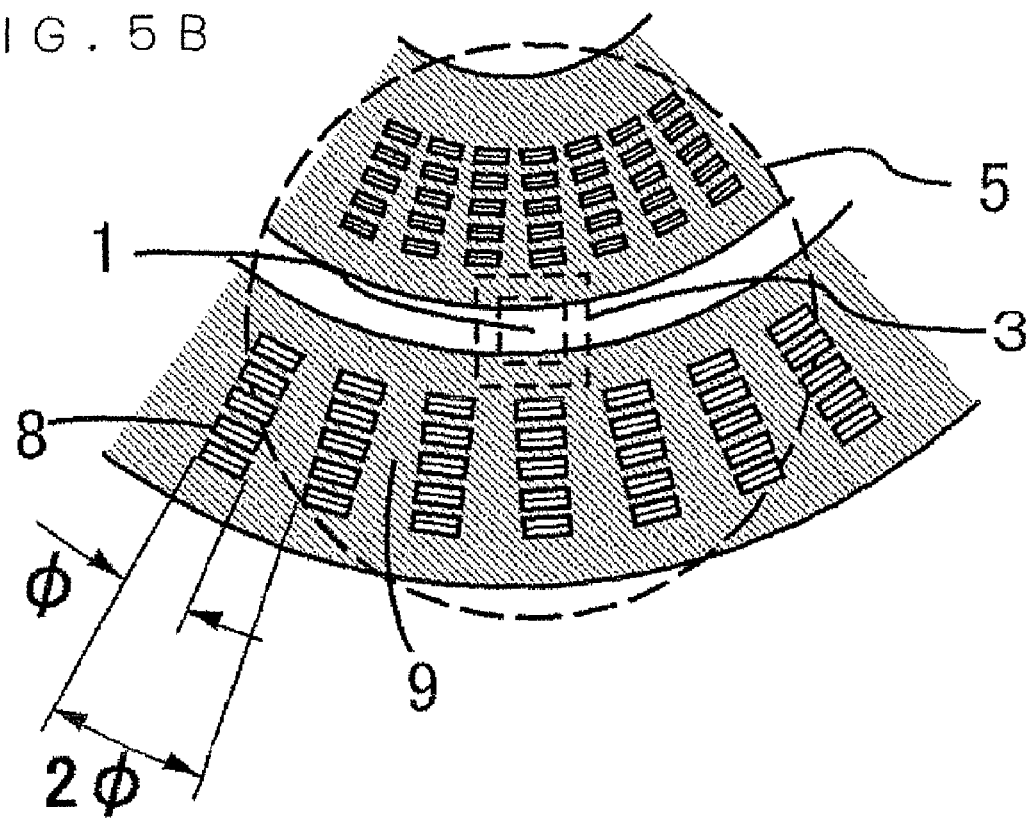

FIGS. 4A, 4B and 5A, 5B show one example and another example of the optical encoder having a rotary type optical scale, respectively, and FIGS. 4A and 5A are plan views viewed from the light detecting portion and FIGS. 4B and 5B are enlarged plan views showing part (surrounded by circles) of the construction shown in FIGS. 4A and 5A. In FIGS. 4A, 4B and 5A, 5B, the tracks 14 and 15 are hatched.

In FIG. 4B, in each of the tracks 14 and 15, a plurality of V-shaped projections 8 are arranged with a period of 2 φ and a width of φ, and the optical scale 7 moves in a direction indicated by the arrow of FIG. 4A relatively to the light source 1, the die pad 3 and the lens 5 (rotates around a central axis of the optical scale 7 as a rotation axis).

In FIG. 5B, in each of the tracks 14 and 15, a plurality of V-shaped projections 8 are arranged and while the tops of the V-shaped projections 8 in FIG. 4B are extended along a direction of the radius of the optical scale 7, the tops of the V-shaped projections 8 of FIG. 5B are extended along a direction orthogonal to the radius direction of the optical scale 7 (in parallel with the traveling direction of the optical scale 7). In each of the tracks 14 and 15, groups each of which consists of five V-shaped projections 8 are arranged with a period of 2φ and a width of φ. The optical scale 7 moves in a direction indicated by the arrow of FIG. 5A relatively to the light source 1, the die pad 3 and the lens 5 (rotates around the central axis of the optical scale 7 as a rotation axis).

Though FIG. 5B shows the case where five V-shaped projections 8 constitute a group, the group is not limited to this but may be constituted of any number of V-shaped projections 8.

Also in the linear type optical scale 7 of FIG. 3B, the V-shaped projections 8 may be arranged so that their tops should be placed in parallel with the traveling direction of the optical scale 7.

Though FIGS. 3A, 4A and 5A show the case where two tracks 14 and 15 are arranged, the arrangement of the tracks is not limited to this, and any number of tracks may be arranged. The number of tracks may be naturally one.

The Second Preferred Embodiment

Figure 6A:
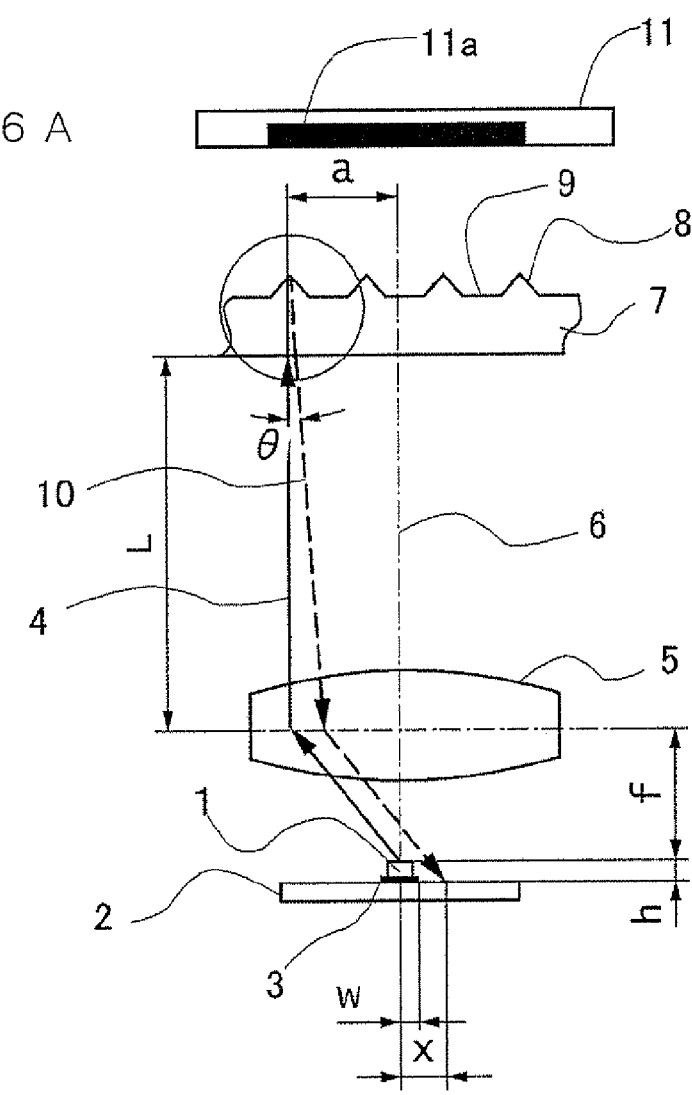
FIGS. 6A and 6B show a construction of an optical encoder in accordance with a second preferred embodiment of the present invention.
Figure 6B:
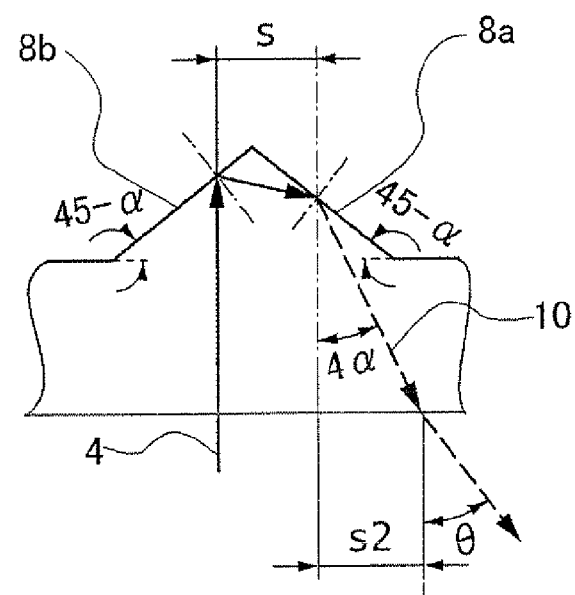

FIGS. 6A and 6B show a construction of an optical encoder in accordance with the second preferred embodiment of the present invention, and FIG. 6A is a cross section showing the whole construction and FIG. 6B is an enlarged cross section showing the vicinity of the V-shaped projection (surrounded by a circle) of the construction shown in FIG. 6A.

While the case where the light ray 4 going on the left side of the optical axis 6 enters the right inclined surface 8a of the V-shaped projection 8 has been discussed in the first preferred embodiment, the case where the light ray 4 going on the left side of the optical axis 6 enters the left inclined surface 8b of the V-shaped projection 8 will be discussed in the second preferred embodiment. This case shows a phenomenon symmetrical to the case where the light ray 4 going on the right side of the optical axis 6 enters the right inclined surface 8a of the V-shaped projection.

Like in the first preferred embodiment, the optical scale 7 is constituted of the V-shaped projections 8 and the flat portions 9, and the tilt angle of the inclined surfaces 8a and 8b of the V-shaped projection 8 is (45−α) degrees with respect to the flat portion 9 (flat surface), where 0<α<45. The angle made by the inclined surfaces 8a and 8b is (90+2α) degrees, i.e., (90+γ) degrees, where 0≦γ≦90. The refractive index of the optical scale 7 is selected so that the critical angle θc which depends on the difference in refractive index between it and a peripheral portion such as air should be smaller than (45−α) degrees.

As shown in FIG. 6A, when the traveling direction of the light ray 4 is parallel with the optical axis 6, since the incident angle is (45−α) degrees, the light ray 4 is totally reflected and enters the right inclined surface 8a. Since the incident angle of the light ray 4 onto the right inclined surface 8a is (45+3α) degrees, the light ray 4 is also totally reflected thereon to become the reflected light 10. At this time, the angle made by the traveling direction of the reflected light 10 and the optical axis 6 is 4α degrees.

The reflected light 10 is refracted at the lower surface of the optical scale 7 and after the angle made by the optical axis 6 and the reflected light 10 becomes θ, the reflected light 10 is refracted by the lens 5 and reaches the substrate 2, but like in the first preferred embodiment, α is set so that the reflected light 10 should enter the substrate 2 at a position outside the die pad 3 (the reflected light 10 should not enter the light emitting portion and the reflecting portion such as the die pad 3 or the electrode around the light emitting portion in the light source 1).

In the second preferred embodiment, since the direction of the reflected light 10 with respect to the optical axis 6 is opposite to that in the first preferred embodiment, x can be expressed as follows:

$$x = \left(\frac{ah}{f}\right) + \left(f - \frac{Lh}{f} + h\right) \times \tan(\theta) \qquad (6)$$

Herein, it is assumed that a distance s between the light ray 4 and a reflection point of the reflected light 10 on the right inclined surface 8a, a distance s2 between the reflection point of the reflected light 10 on the right inclined surface 8a and the intersection between the reflected light 10 and the lower surface of the optical scale 7 and the aberration of the lens 5 are all negligible.

When tan θ=θ, sin θ=θ, sin(4α)=4α, from Eqs. (1), (3) and (6), $$\alpha > \frac{wf - ah}{4n(f^2 + hf - Lh)} \text{ (rad)} \quad (7)$$

When w=0.5 mm, f=5 mm, h=0.25 mm, a=2 mm, L=5 mm and n=1.5, for example, Eq. (7) is calculated as:

$$\alpha > 0.013(rad) \approx 0.76(deg)$$

Though it is also assumed in the second preferred embodiment that the substrate 2 has a surface in which light is absorbed or scattered and very few light is regularly reflected, however, if the substrate 2 has a high rate of regular reflection like the die pad 3, the above reference sign w represents a distance between an end of a region having a high rate of regular reflection and the light emitting point of the light source 1 instead.

In the second preferred embodiment, α is set so that Eq. (1) should be satisfied for a which represents the incident position of the light ray 4 with respect to the optical scale 7 in all the cases or most cases. If a takes a value ranging from −2 mm to +2 mm, the value of the right side of Eq. (7) becomes maximum when a=−2 mm, and like in the first preferred embodiment, the value is;

$$\alpha > 0.02(rad) \approx 1.15(deg)$$

where it is assumed that the left direction of FIG. 6A is + (positive) with respect to a and other variables are scalar (positive values having no direction). In other words, if the light ray 4 enters either the right inclined surface 8a or the left inclined surface 8b, α may be set larger than the maximum value in the right side of Eq. (4) or (7) when a is changed.

Further, α is so set as to satisfy Eq. (5), and from n=1.5, α satisfies;

$$\alpha < 3.19(deg)$$

Though x and a are expressed by Eqs. (6) and (7), respectively, in the second preferred embodiment, the expressions are naturally changed when the constitution of the optical system is changed.

Like in the first preferred embodiment, it is preferable that the value of the above reference sign α should be about 3 degrees or less regardless of the critical angle θ c of the optical scale 7. This is intended to reduce the probability that the light ray 4 reflected on the left inclined surface 8b might not enter the right inclined surface 8a and go to an unexpected direction, being a stray light.

As discussed above, in the second preferred embodiment, since it is constructed so that the incident light 4 entering one inclined surface 8b should be totally reflected thereon to enter the other inclined surface 8a and then should be totally reflected on the other inclined surface 8a and the reflected light 10 reflected on the other inclined surface 8a should not enter the light emitting portion and the reflecting portion (such as the electrode of the light source 1 (light emitting element) or the die pad 3) around the light emitting portion in the light source 1, and the light ray 10 reflected on the light non-transparent portion (V-shaped projection 8) in one track on the optical scale 7 does not enter the reflecting portion such as the electrode or the die pad 3 in the light source 1 but is absorbed or scattered therein, the light ray 10 hardly enters the other track or the original track. As a result, it is possible to suppress a detection error caused by reentrance of the light ray 10 reflected on the light non-transparent portion (the V-shaped projection 8) into the other track or the original track.

The above discussion has been made on the case where it is constructed so that the incident light 4 entering one inclined surface 8b should be totally reflected to enter the other inclined surface 8a and should be further totally reflected on the other inclined surface 8a. Since the incident light is surely reflected totally on the light non-transparent portion (the inclined surfaces 8a and 8b) without being leaked on the side where the light detecting element 11a is placed, this also produces an effect of suppressing the stray light which is a cause of error. Not only in the case where the incident light is totally reflected on the other inclined surface 8a, however, but also in the case where at least part of the incident light is reflected on the other inclined surface 8a, similarly, with the construction where the reflected light 10 reflected on the other inclined surface 8a should not enter the light emitting portion and the reflecting portion (the electrode of the light source 1 (light emitting element) and the die pad 3) around the light emitting portion in the light source 1, it is possible to suppress a detection error caused by the light ray 10 reflected on the light non-transparent portion (the V-shaped projection 8).

In a case where the light ray 4 enters the optical scale 7, being inclined at an angle of φ with respect to the optical axis 6, in other words, in a case where an angle made by the normal of the flat surface (the flat portion 9) and the optical axis 6 of the incident light 4 from the light source 1 is φ, Eq. (3) is changed as follows, where with respect to φ, the counter-clockwise direction is positive with the optical axis 6 as a reference in FIG. 6A and the others are scalar.

$$\theta = |\sin^{-1}(n \sin(4\alpha + \phi))| \quad (3b)$$

Further, in all the cases or most cases of a representing the incident position of the light ray 4, α is set as follows:

$$(-45 + \theta c - \phi)/3 < \alpha < 45 - \theta c - \phi(deg) \quad (5b)$$

If φ≦−4 α, in other words, α≧−φ/4 is satisfied, α is set so that the conditional expression obtained by substituting Eq. (3b) into Eqs. (6) and (1) and 0<α<45 as well as Eq. (5b) should be satisfied.

If φ>−4α, in other words, α<−φ/4 is satisfied, α is set so that the conditional expression obtained by substituting Eq. (3b) into Eqs. (2) and (1) and 0<α<45 as well as Eq. (5b) should be satisfied.

Though the first and second preferred embodiments show the respective ranges of design values of α in the case where the light ray 4 enters the optical scale 7, being inclined at an angle of φ with respect to the optical axis 6 and the light ray 4 enters the right inclined surface 8a and the left inclined surface 8b, in an actual design, α has only to be set so that both conditional ranges of design values shown in the first and second preferred embodiments should be satisfied.

Needless to say, the optical scale 7 may be either a linear type shown in, e.g., FIG. 3B or a rotary type shown in, e.g., FIGS. 4B and 5B.

The Third Preferred Embodiment

Figure 7A:
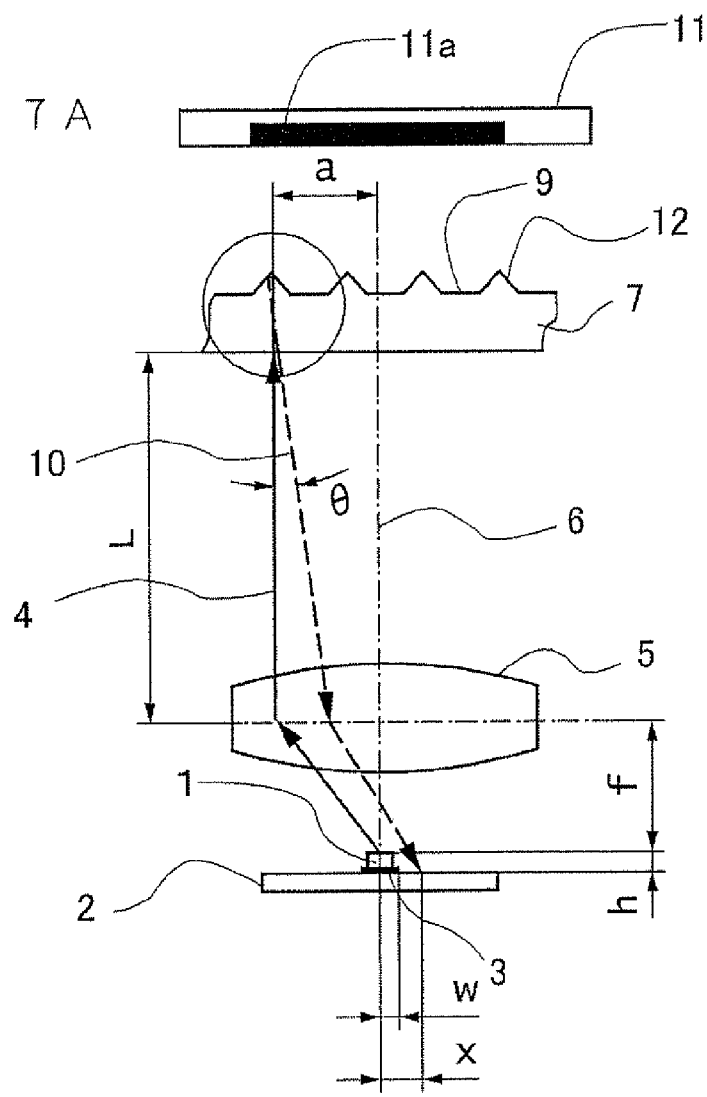
FIGS. 7A and 7B show a construction of an optical encoder in accordance with a third preferred embodiment of the present invention.
Figure 7B:
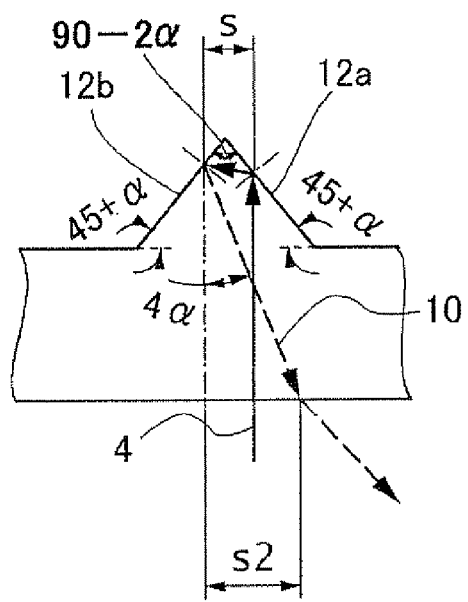

FIGS. 7A and 7B show a construction of an optical encoder in accordance with the third preferred embodiment of the present invention, and FIG. 7A is a cross section showing the whole construction and FIG. 7B is an enlarged cross section showing the vicinity of the V-shaped projection (surrounded by a circle) of the construction shown in FIG. 7A.

While the optical scale 7 is constituted of the V-shaped projections 12 and the flat portions 9 like in the first and second preferred embodiments, the tilt angle of the inclined surfaces 12a and 12b of the V-shaped projection 12 is (45+α) degrees with respect to the flat portion 9 (flat surface), where 0<α<45, unlike in the first and second preferred embodiments. Further, the angle made by the inclined surfaces 12a and 12b is (90−2α) degrees, i.e., (90−γ) degrees, where 0≦γ≦90.

The refractive index of the optical scale 7 is selected so that the critical angle θc which depends on the difference in refractive index between it and a peripheral portion such as air should be smaller than (45−3α) degrees. Therefore, since the light ray 4 entering the V-shaped projection 12 is reflected thereon, the light ray 4 does not enter the light detecting element 11 but only the light ray 4 entering the flat portion 9 and passing therethrough enters the light detecting element 11 to be detected.

FIG. 7B shows a case where the light ray 4 going on the left side of the optical axis 6 enters the right slope (the inclined surface on the right side) 12a of the V-shaped projection 12. If the traveling direction of the light ray 4 is parallel with the optical axis 6, since the incident angle is (45+α) degrees, the light ray 4 is totally reflected and enters the left slope (the inclined surface on the left side) 12b. Since the incident angle of the light entering the left inclined surface 12b is (45−3α) degrees, the light ray is totally reflected to become the reflected light 10. In this case, the angle made by the traveling direction of the reflected light 11 and the optical axis 6 is 4α. Since the angle made by the inclined surfaces 12a and 12b is (90−2α) degrees, in other words, out of 90 degrees, the reflected light 10 is not parallel with the incident light 4.

The reflected light 10 is refracted at a boundary between the optical scale 7 and the peripheral portion and after the angle made by the optical axis 6 and the reflected light 10 becomes θ, the reflected light 10 is refracted by the lens 5 and reaches the substrate 2, but in the third preferred embodiment, α is set so that the reflected light 10 should enter the substrate 2 at a position outside the die pad 3 (the reflected light 10 should not enter the light emitting portion and the reflecting portion such as the die pad 3 or the electrode around the light emitting portion in the light source 1), in other words, $$x > w \quad (1)$$

should be satisfied, where x represents a distance between the incident position of the reflected light 10 onto the substrate 2 and the light emitting point of the light source 1 and w represents a distance between an end of the die pad 3 and the light emitting point of the light source 1.

In the third preferred embodiment, like in the second preferred embodiment, x can be expressed as;

$$x = \left(\frac{ah}{f}\right) + \left(f - \frac{Lh}{f} + h\right) \times \tan(\theta) \quad (6)$$

$$\theta = \sin^{-1}(n\sin(4\alpha)) \quad (3)$$

where f represents a focal length of the lens 5, h represents a thickness of the light source 1, a represents a distance between the incident position of the light ray 4 onto the optical scale 7 and the optical axis 6, L represents a distance between a principal plane of the lens 5 and a lower surface of the optical scale 7 and n represents the refractive index of the optical scale 7. Herein, it is assumed that a distance s between the light ray 4 and a reflection point of the reflected light 10 on the left inclined surface 12b, a distance s2 between the reflection point of the reflected light 10 on the left inclined surface 12b and the intersection between the reflected light 11 and the lower surface of the optical scale 7 and the aberration of the lens 5 are all negligible. Further, the outside of the optical scale 7 is assumed to be air having a refractive index of 1.

When tan θ=θ, sin θ=θ, sin(4 α)=4 α, from Eqs. (1), (3) and (6), $$\alpha > \frac{wf - ah}{4n(f^2 + hf - Lh)} \text{ (rad)} \quad (7)$$

When w=0.5 nun, f=5 mm h=0.25 mm, a=−2 to +2 mm, L=5 mm and n=1.7, for example, Eq. (7) is calculated as:

$$\alpha > 0.018(rad) \approx 1.01(deg)$$

where the value of the right side of Eq. (7) becomes maximum when a=−2 mm, and α is set so that this condition should be satisfied. It is assumed that the left direction of FIG. 7 is + (positive) with respect to a and other variables are scalar (positive values having no direction). Herein, the refractive index n of the optical scale 7 is 1.7, unlike in the first and second preferred embodiments.

Though it is assumed also in the third preferred embodiment that the substrate 2 has a surface in which light is absorbed or scattered and very few light is regularly reflected, however, if the substrate 2 has a high rate of regular reflection like the die pad 3, the above reference sign w represents a distance between an end of a region having a high rate of regular reflection and the light emitting point of the light source 1 instead.

Further, the critical angle θ c of the optical scale 7 is smaller than (45−3 α) degrees (θ c<45−3 α) as discussed above. In other words, from $$\alpha < (45 - \theta c)/3 (deg) \quad (8)$$

and n=1.7, α<2.99 (deg) is satisfied.

Though x and a are expressed by Eqs. (6) and (7), respectively, in the third preferred embodiment, the expressions are naturally changed when the constitution of the optical system is changed.

As discussed above, in the third preferred embodiment, since it is constructed so that the incident light 4 entering one inclined surface 12a should be totally reflected thereon to enter the other inclined surface 12b and then should be totally reflected on other inclined surface 12b and the reflected light 10 reflected on the other inclined surface 12b should not enter the light emitting portion and the reflecting portion (such as the electrode of the light source 1 (light emitting element) or the die pad 3) around the light emitting portion in the light source 1, and the light ray 10 reflected on the light non-transparent portion (V-shaped projection 12) in one track on the optical scale does not enter the reflecting portion such as the electrode or the die pad 3 in the light source 1 but is absorbed or scattered therein, the light ray 10 hardly enters the other track or the original track. As a results it is possible to suppress a detection error caused by reentrance of the light ray reflected on the light non-transparent portion (the V-shaped projection 12) into the other track or the original track.

The above discussion has been made on the case where it is constructed so that the incident light 4 entering one inclined surface 12a should be totally reflected to enter the other inclined surface 12b and should be further totally reflected on the other inclined surface 12b. Since the incident light is surely reflected totally on the light non-transparent portion (the inclined surfaces 12a and 12b) without being leaked on the side where the light detecting element 11a is placed, this also produces an effect of suppressing the stray light which is a cause of error. Not only in the case where the incident light is totally reflected on the other inclined surface 12b, however, but also in the case where at least part of the incident light is reflected on the other inclined surface 12b, similarly, with the construction where the reflected light 10 reflected on the other inclined surface 12b should not enter the light emitting portion and the reflecting portion (the electrode of the light source 1 (light emitting element) and the die pad 3) around the light emitting portion in the light source 1, it is possible to suppress a detection error caused by the light ray reflected on the light non-transparent portion (the V-shaped projection 12).

In a case where the light ray 4 enters the optical scale 7, being inclined outward at an angle of φ with respect to the optical axis 6, in other words, in a case where an angle made by the normal of the flat surface (the flat portion 9) and the optical axis 6 of the incident light 4 from the light source 1 is φ, Eq. (3) is changed as follows, like in the second preferred embodiment, where with respect to φ, the counterclockwise direction is positive with the optical axis 6 as a reference in FIG. 7A and the others are scalar like in Eq. (3).

$$\theta = |\sin^{-1}(n \sin(4\alpha+\phi))| \quad (3b)$$

Further, in all the cases or most cases of a representing the incident position of the light ray 4, α is set as follows:

$$-45+\theta c-\phi<\alpha<(45-\theta c-\phi)/3 (deg) \quad (5c)$$

If φ≧−4 α, in other words, α≧−φ/4 is satisfied, α is set so that the conditional expression obtained by substituting Eq. (3b) into Eqs. (6) and (1) and 0<α<45 as well as Eq. (5c) should be satisfied.

If φ<−4α, in other words, α<−φ/4 is satisfied, α is set so that the conditional expression obtained by substituting Eq. (3b) into Eqs. (2) and (1) and 0<α<45 as well as Eq. (5c) should be satisfied.

Though the above discussion has been made on the case where the light ray 4 going on the left side of the optical axis 6 enters the right inclined surface 12a of the V-shaped projection 12, if the light ray 4 going on the right side of the optical axis 6 enters the left inclined surface 12b of the V-shaped projection 12, the phenomenon symmetrical to the above case occurs.

Further, if the light ray 4 going on the left side of the optical axis 6 enters the left inclined surface 12b of the V-shaped projection 12, α is set so that 0<α<45, the conditional expression obtained from Eqs. (1), (2) and (3a) and Eq. (5d) below should be satisfied.

$$-45+\theta c+\phi<\alpha<(45-\theta c+\phi)/3 (deg) \quad (5d)$$

where φ≦4 α, in other words, α≧φ/4 is satisfied.

If φ>4α, in other words, α≧φ/4 is satisfied, α is set so that 0<α<45, the conditional expression obtained from Eqs. (1), (6) and (3a) and Eq. (5d) should be satisfied.

Though the third preferred embodiment shows the respective ranges of design values of α in the case where the light ray 4 enters the optical scale 7, being inclined at an angle of φ with respect to the optical axis 6 and the light ray 4 enters the right inclined surface 8a and the left inclined surface 8b, in an actual design, α is set so that both conditional ranges of design values shown in the third preferred embodiment should be satisfied.

Needless to say, the optical scale 7 may be either a linear type shown in, e.g., FIG. 3B or a rotary type shown in, e.g., FIGS. 4A, 4B and 5A, 5B.

The Fourth Preferred Embodiment

Figure 8:
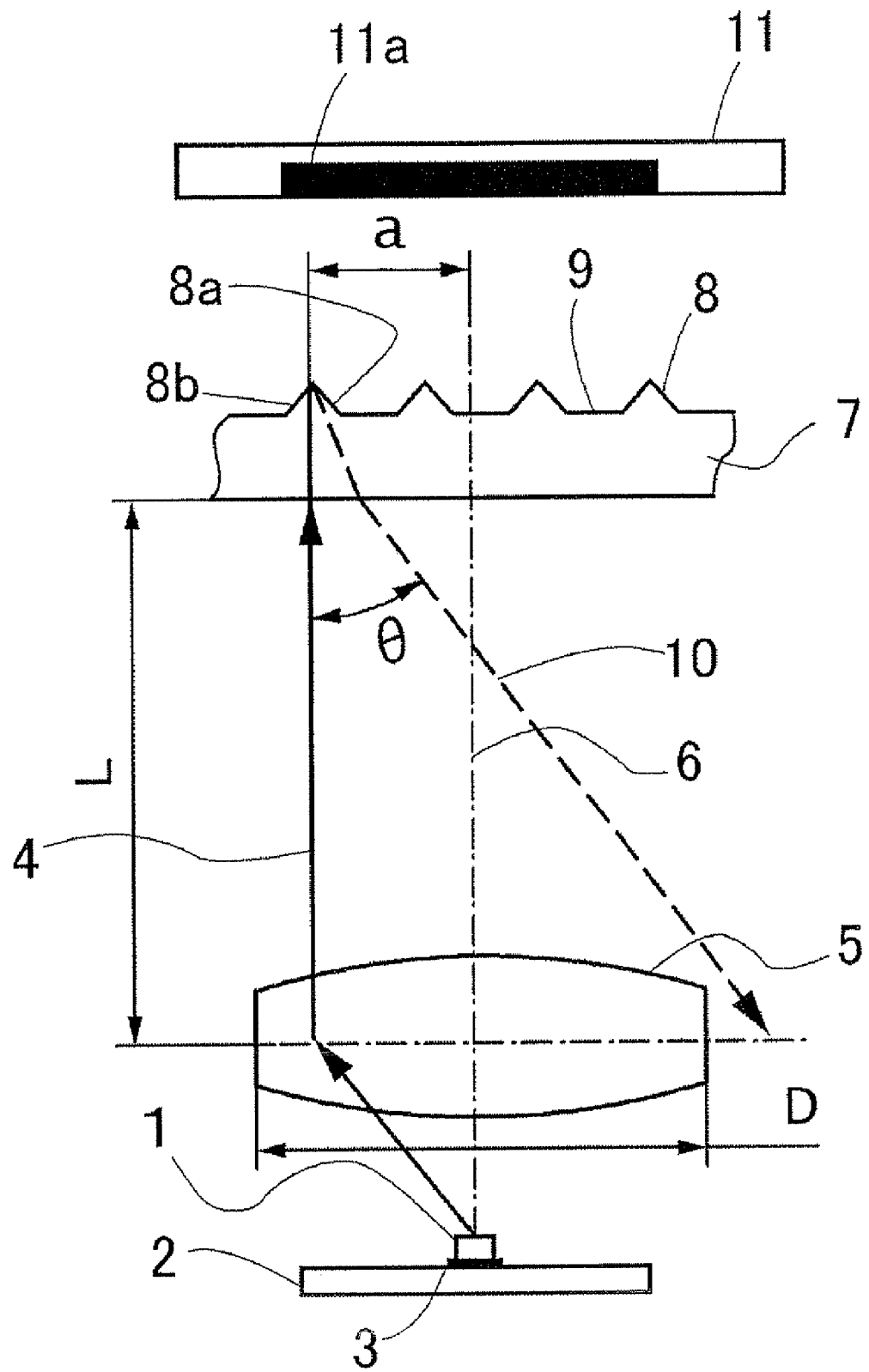
FIG. 8 is a cross section showing a construction of an optical encoder in accordance with a fourth preferred embodiment of the present invention.

FIG. 8 is a cross section showing a construction of an optical encoder in accordance with the fourth preferred embodiment of the present invention. Like in the first and second preferred embodiments, the optical scale 7 is constituted of the V-shaped projections 8 and the flat portions 9, and the tilt angle of the inclined surfaces 8a and 8b of the V-shaped projection 8 is (45−α) degrees with respect to the flat portion 9 (flat surface), where 0<α<45. The angle made by the inclined surfaces 8a and 8b is (90+2α) degrees, i.e., (90+γ) degrees, where 0≦γ≦90.

The fourth preferred embodiment shows the case where the Light ray 4 going on the left side of the optical axis 6 enters the left inclined surface 8b.

The refractive index of the optical scale 7 is selected so that the critical angle θc which depends on the difference in refractive index between the optical scale 7 and a peripheral portion such as air should be smaller than (45−α) degrees.

Further in the fourth preferred embodiment, α is set so that the reflected light 10 within a range of the incident position a of the light ray 4 onto the optical scale 7 should not enter anywhere within an effective diameter D of the lens 5.

Specifically, α is set so that;

$$a-L \tan \theta <-D/2 \quad (9)$$

should be satisfied, where it is assumed that the left direction of FIG. 8 is + (positive) with respect to a.

Herein, as shown in FIG. 2B, it is assumed that both a distance s between the light ray 4 and the reflection point of the reflected light 10 on the right inclined surface 8a and a distance s2 between the reflection point of the reflected light 10 on the right inclined surface 8a and the intersection between the reflected light 10 and the lower surface of the optical scale 7 are negligible.

When tan θ=θ, sin θ=θ, sin(4α)=4α, from Eqs. (3) and (9), $$\alpha > (2a+D)/8nL (rad) \quad (10)$$

When a=−D/2 to +D/2, D=2 mm, n=1.5 and L=10 mm, for example, α is set so that;

$$\alpha > 0.03 (rad) \approx 1.91 (deg)$$

should be satisfied.

Further, α is set so that Eq. (5) should be also satisfied. From n=1.5, α is set so that;

$$\alpha > 3.19 (deg)$$

should be satisfied.

Though α is expressed by Eq. (10) in the fourth preferred embodiment, the expression is naturally changed when the constitution of the optical system is changed.

Like in the first and second preferred embodiments, it is preferable that the value of the above reference sign α should be about 3 degrees or less regardless of the critical angle θc of the optical scale 7. This is intended to reduce the probability that the light ray 4 reflected on the left inclined surface 8b might not enter the right inclined surface 8a and go to an unexpected direction, being a stray light.

As discussed above, in the fourth preferred embodiment, since it is constructed so that the incident light 4 entering one inclined surface 8b should be totally reflected thereon to enter the other inclined surface 8a and then should be totally reflected on the other inclined surface 8a and the reflected light 10 reflected on the other inclined surface 8a should not enter the light emitting portion and the reflecting portion (such as the electrode of the light source 1 (light emitting element) or the die pad 3) around the light emitting portion in the light source 1, and the light ray 10 reflected on the light non-transparent portion (V-shaped projection 8) in one track on the optical scale 7 does not enter the reflecting portion such as the electrode or the die pad 3 in the light source 1, the light ray 10 hardly enters the other track or the original track. As a result, it is possible to suppress a detection error caused by reentrance of the light ray 10 reflected on the light non-transparent portion (the V-shaped projection 8) into the other track or the original track.

The above discussion has been made on the case where it is constructed so that the incident light 4 entering one inclined surface 8b should be totally reflected to enter the other inclined surface 8a and should be further totally reflected on the other inclined surface 8a. Since the incident light is surely reflected totally on the light non-transparent portion (the inclined surfaces 8a and 8b) without being leaked on the side where the light detecting element 11a is placed, this also produces an effect of suppressing the stray light which is a cause of error. Not only in the case where the incident light is totally reflected on the other inclined surface 8a, however, but also in the case where at least part of the incident light is reflected on the other inclined surface 8a, similarly, with the construction where the reflected light 10 reflected on the other inclined surface 8a should not enter the light emitting portion and the reflecting portion (the electrode of the light source 1 (light emitting element) and the die pad 3) around the light emitting portion in the light source 1, it is possible to suppress a detection error caused by the light ray reflected on the light non-transparent portion (the V-shaped projection 8).

In a case where the light ray 4 enters the optical scale 7, being inclined outward at an angle of $\phi$ with respect to the optical axis 6, in other words, in a case where an angle made by the normal of the flat surface (the flat portion 9) and the optical axis 6 of the incident light 4 from the light source 1 is $\phi$, Eq. (3) is changed as follows, like in the second preferred embodiment, where with respect to $\phi$, the counterclockwise direction is positive and the others are scalar.

$$\theta = |\sin^{-1}(n \sin(4\alpha + \phi))| \quad (3b)$$

Further, in all the cases or most cases of a representing the incident position of the light ray 4, $\alpha$ has only to be set as follows:

$$(-45 + \theta c - \phi)/3 < \alpha < 45 - \theta c - \phi (deg) \quad (5b)$$

If $\phi \geq -4\alpha$, in other words, $\alpha \geq -\phi/4$ is satisfied, $\alpha$ is set so that the conditional expression obtained by substituting Eq. (3b) into Eq. (9) and $0 < \alpha < 45$ as well as Eq. (5b) should be satisfied.

If $\phi < -4\alpha$, in other words, $\alpha < -\phi/4$ is satisfied, $\alpha$ is set so that the conditional expression obtained by substituting Eq. (3b) into Eq. (9b) and $0 < \alpha < 45$ as well as Eq. (5b) should be satisfied.

$$a + L \tan \theta > D/2 \quad (9b)$$

Though the above discussion in the fourth preferred embodiment has been made on the case where the light ray 4 going on the left side of the optical axis 6 enters the left inclined surface 8b of the V-shaped projection 8, if the light ray 4 going on the right side of the optical axis 6 enters the right inclined surface 8a of the V-shaped projection 8, the phenomenon symmetrical to the above case occurs.

Further, if the light ray 4 going on the left side of the optical axis 6 enters the right inclined surface 8a of the V-shaped projection 8, $\alpha$ is set so that $0 < \alpha < 45$, the conditional expression obtained from Eqs. (3a) and (9b) and Eq. (5a) should be satisfied, where $\phi \leq 4\alpha$, in other words, $\alpha \geq \phi/4$ is satisfied.

If $\phi > 4\alpha$, in other words, $\alpha < \phi/4$ is satisfied, $\alpha$ is set so that $0 < \alpha < 45$, the conditional expression obtained from Eqs. (3a) and (9) and Eq. (5a) should be satisfied.

Further, though the above discussion in the fourth preferred embodiment has been made on the case where the tilt angle of the inclined surfaces 8a and 8b of the V-shaped projection 8 is $(45-\alpha)$ degrees with respect to the flat portion 9 (flat surface), also if the tilt angle of the inclined surfaces 8a and 8b of the V-shaped projection 8 is $(45+\alpha)$ degrees with respect to the flat portion 9 (flat surface), with the same manner, $\alpha$ is set so that the reflected light 10 should not enter anywhere within the effective diameter D of the lens 5 within a range of the incident position a of the light ray 4 onto the optical scale 7.

Though the fourth preferred embodiment shows the respective ranges of design values of $\alpha$ in the case where the light ray 4 enters the optical scale 7, being inclined at an angle of $\phi$ with respect to the optical axis 6 and the light ray 4 enters the right inclined surface 8a and the left inclined surface 8b, in an actual design, $\alpha$ is set so that both conditional ranges of design values shown in the fourth preferred embodiment should be satisfied.

Needless to say, the optical scale 7 may be either a linear type shown in, e.g., FIG. 3 or a rotary type shown in, e.g., FIGS. 4 and 5.

The Fifth Preferred Embodiment

Figure 9A:
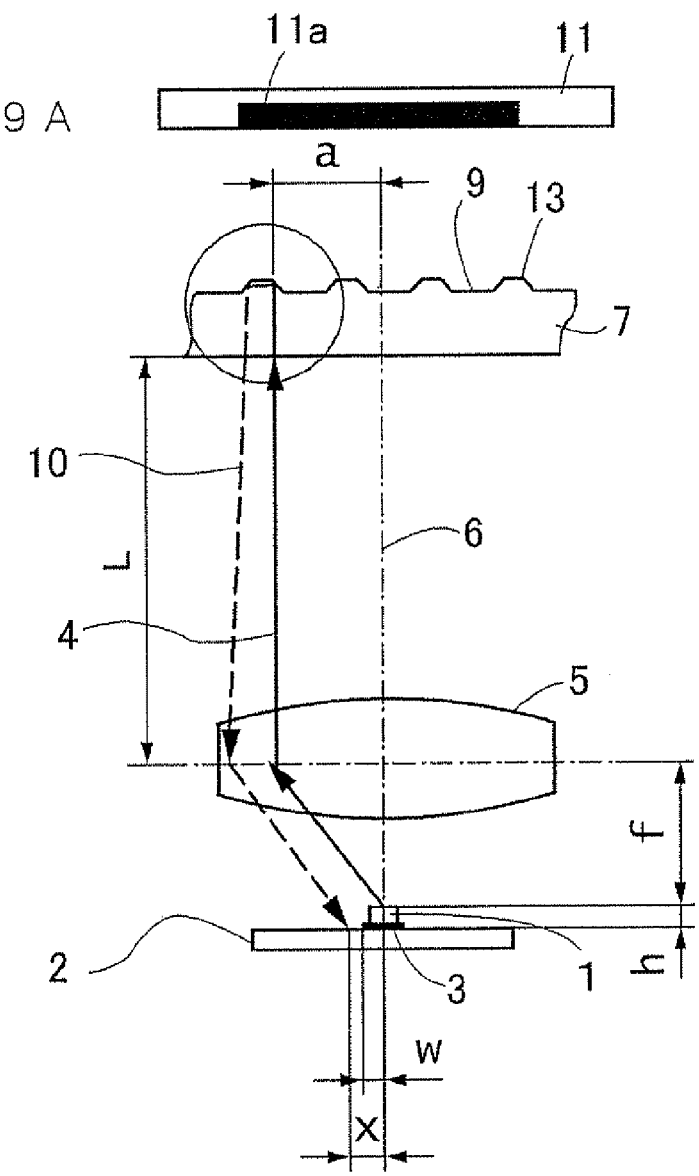
FIGS. 9A and 9B show a construction of an optical encoder in accordance with a fifth preferred embodiment of the present invention.
Figure 9B:
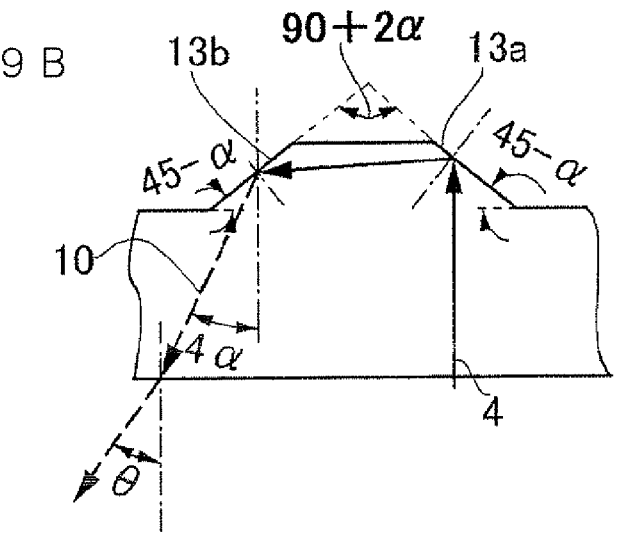

FIGS. 9A and 9B show a construction of an optical encoder in accordance with the fifth preferred embodiment of the present invention, and FIG. 9A is a cross section showing the whole construction and FIG. 9B is an enlarged cross section showing the vicinity of a trapezoidal projection (surrounded by a circle) of the construction shown in FIG. 9A.

While the V-shaped projections 8 or the V-shaped projections 12 are used and the light ray 4 is reflected on the inclined surfaces 8a and 8b or 12a and 12b in the first, second, third and fourth preferred embodiments, trapezoidal projections 13 are used and the light ray 4 is reflected on inclined surfaces 13a and 13b thereof in the fifth preferred embodiment.

Also in the fifth preferred embodiment, like in the first, second, third and fourth preferred embodiments, a tilt angle of the inclined surfaces 13a and 13b is $(45-\alpha)$ degrees or $(45+\alpha)$ degrees with respect to the flat portion 9 (flat surface) and $\alpha$ is set in the same manner as shown in the first, second, third and fourth preferred embodiments, and therefore the reflected light 10 does not thereby enter the reflection film such as the electrode or the die pad 3 of the light source 1. Also in this case, an angle made by the inclined surfaces 13a and 13b is $(90+2\alpha)$ degrees or $(90-2\alpha)$ degrees, i.e., $(90+\gamma)$ degrees or $(90-\gamma)$ degrees, where $0 < \gamma < 90$.

FIG. 9 shows a case, as a typical example, where the tilt angle is $(45-\alpha)$ degrees with respect to the flat portion 9 (flat surface) and the light ray 4 going on the left side of the optical axis 6 enters the right inclined surface 13a of the trapezoidal projection 13.

As discussed above, in the fifth preferred embodiment, since it is constructed so that the incident light 4 entering one inclined surface 13a (or inclined surface 13b) should be totally reflected thereon to enter the other inclined surface 13b (or inclined surface 13a) and then should be totally reflected on the other inclined surface 13b (or inclined surface 13a) and the reflected light 10 reflected on the other inclined surface 13b (or inclined surface 13a) should not enter the light emitting portion and the reflecting portion (such as the electrode of the light source 1 (light emitting element) or the die pad 3) around the light emitting portion in the light source 1, and the light ray 10 reflected on the light non-transparent portion (the inclined surface 13a or 13b of the trapezoidal projection 13) in one track on the optical scale 7 does not enter the reflecting portion such as the electrode or the die pad 3 in the light source 1 but is absorbed or scattered therein, the light ray 10 hardly enters the other track or the original track. As a result, it is possible to suppress a detection error caused by reentrance of the light ray 10 reflected on the light non-transparent portion (the inclined surface 13a or 13b of the trapezoidal projection 13) into the other track or the original track.

The above discussion has been made on the case where it is constructed so that the incident light 4 entering one inclined surface 13a (or inclined surface 13b) should be totally reflected to enter the other inclined surface 13b (or inclined surface 13a) and should be further totally reflected on the other inclined surface 13b (or inclined surface 13a). Since the incident light is surely reflected totally on the light non-transparent portion (the inclined surfaces 13a and 13b) without being leaked on the side where the light detecting element 11a is placed, this also produces an effect of suppressing the stray light which is a cause of error. Not only in the case where the incident light is totally reflected on the other inclined surface 13b (or inclined surface 13a), however, but also in the case where at least part of the incident light is reflected on the other inclined surface 13b (or inclined surface 13a), similarly, with the construction where the reflected light 10 reflected on the other inclined surface 13b (or inclined surface 13a) should not enter the light emitting portion and the reflecting portion (the electrode of the light source 1 (light emitting element) and the die pad 3) around the light emitting portion in the light source 1, it is possible to suppress a detection error caused by the light ray 10 reflected on the light non-transparent portion (the inclined surface 13a or 13b of the trapezoidal projection 13).

In a case where the light ray 4 enters the optical scale 7, being inclined outward at an angle of $\phi$ with respect to the optical axis 6, in other words, in a case where an angle made by the normal of the flat surface (the flat portion 9) and the optical axis 6 of the incident light 4 from the light source 1 is $\phi$, Eq. (3) is changed into Eq. (3a) or (3b) and Eq. (5) is changed into Eq. (5a), (5b), (5c) or (5d), like in the first, second, third and fourth preferred embodiments.

Needless to say, the optical scale 7 may be either a linear type shown in, e.g., FIGS. 3A, 3B or a rotary type shown in, e.g., FIGS. 4A, 4B and 5A, 5B.

The Sixth Preferred Embodiment

Figure 10A:
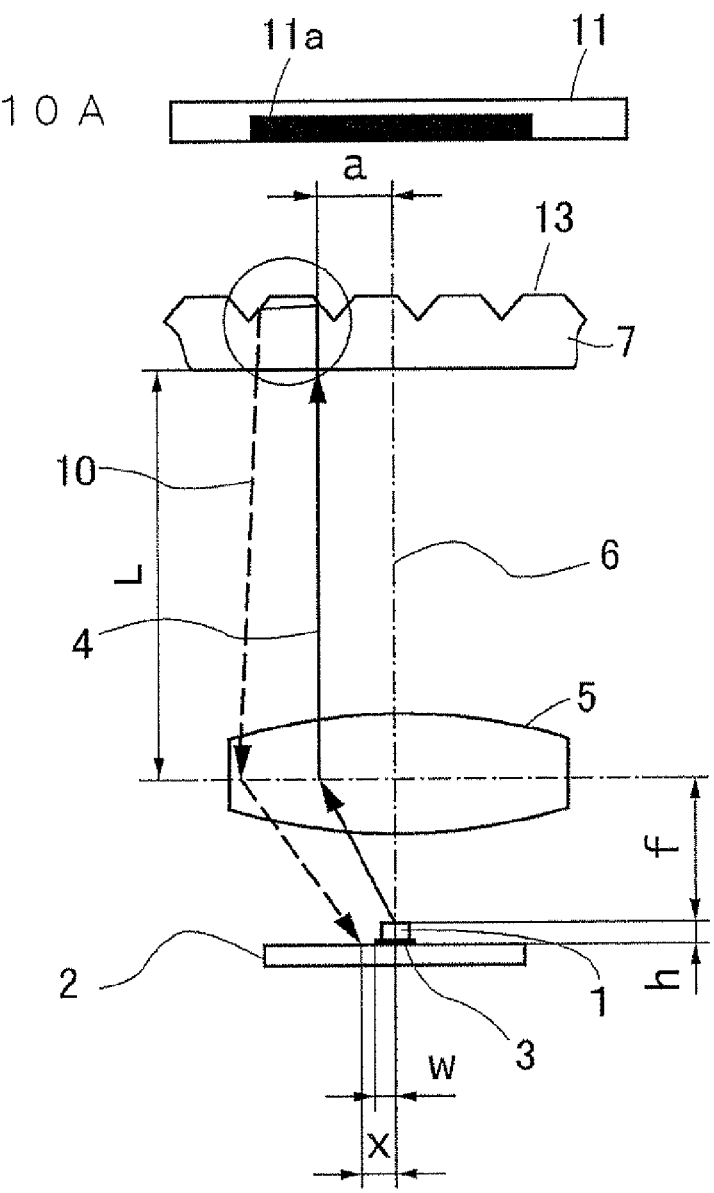
FIGS. 10A and 10B show a construction of an optical encoder in accordance with a sixth preferred embodiment of the present invention.
Figure 10B:
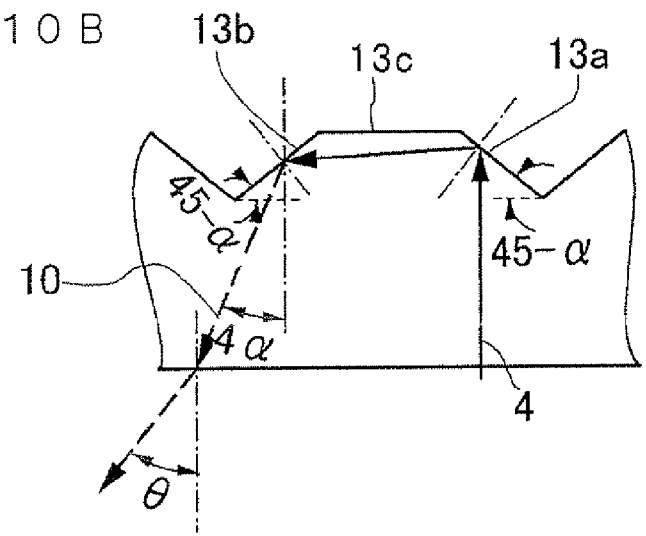

FIGS. 10A and 10B show a construction of an optical encoder in accordance with the sixth preferred embodiment of the present invention, and FIG. 10A is a cross section showing the whole construction and FIG. 10B is an enlarged cross section showing the vicinity of the trapezoidal projection (surrounded by a circle) of the construction shown in FIG. 10A.

While the optical scale 7 is constituted of the trapezoidal projections 13 and the flat portions 9 which are alternately arranged in the fifth preferred embodiment, no flat portion 9 is provided and the trapezoidal projections 13 are continuously arranged and an upper base (flat surface) 13c functions as light transmission portion in the sixth preferred embodiment.

Also in the sixth preferred embodiment, like in the fifth preferred embodiment, the tilt angle of the inclined surfaces 13a and 13b is $(45-\alpha)$ degrees or $(45+\alpha)$ degrees with respect to the upper base (flat surface) 13c and $\alpha$ is set in the same manner as shown in the first, second, third and fourth preferred embodiments, and therefore the reflected light 10 does not thereby enter the reflection film such as the electrode or the die pad 3 of the light source 1. Also in this case, the angle made by the inclined surfaces 13a and 13b is $(90+2\alpha)$ degrees or $(90-2\alpha)$ degrees, i.e., $(90+\gamma)$ degrees or $(90-\gamma)$ degrees, where $0<\gamma<90$.

FIG. 10B shows a case, as a typical example, where the tilt angle is $(45-\alpha)$ degrees and the light ray 4 going on the left side of the optical axis 6 enters the right inclined surface 13a of the trapezoidal projection 13.

As discussed above, in the sixth preferred embodiment, since it is constructed so that the incident light 4 entering one inclined surface 13a (or inclined surface 13b) should be totally reflected thereon to enter the other inclined surface 13b (or inclined surface 13a) and then should be totally reflected on the other inclined surface 13b (or inclined surface 13a) and the reflected light 10 reflected on the other inclined surface 13b (or inclined surface 13a) should not enter the light emitting portion and the reflecting portion (such as the electrode of the light source 1 (light emitting element) or the die pad 3) around the light emitting portion in the light source 1, and the light ray 10 reflected on the light non-transparent portion (the inclined surface 13a or 13b of the trapezoidal projection 13) in one track on the optical scale 7 does not enter the reflecting portion such as the electrode or the die pad 3 in the light source 1 but is absorbed or scattered therein, the light ray 10 hardly enters the other track or the original track. As a result, it is possible to suppress a detection error caused by reentrance of the light ray 10 reflected on the light non-transparent portion (the inclined surface 13a or 13b of the trapezoidal projection 13) into the other track or the original track.

The above discussion has been made on the case where it is constructed so that the incident light 4 entering one inclined surface 13a (or inclined surface 13b) should be totally reflected to enter the other inclined surface 13b (or inclined surface 13a) and should be further totally reflected on the other inclined surface 13b (or inclined surface 13a). Since the incident light is surely reflected totally on the light non-transparent portion (the inclined surfaces 13a and 13b) without being leaked on the side where the light detecting element 11a is placed, this also produces an effect of suppressing the stray light which is a cause of error. Not only in the case where the incident light is totally reflected on the other inclined surface 13b (or inclined surface 13a), however, but also in the case where at least part of the incident light is reflected on the other inclined surface 13b (or inclined surface 13a), similarly, with the construction where the reflected light 10 reflected on the other inclined surface 13b (or inclined surface 13a) should not enter the light emitting portion and the reflecting portion (the electrode of the light source 1 (light emitting element) and the die pad 3) around the light emitting portion in the light source 1, it is possible to suppress a detection error caused by the light ray 10 reflected on the light non-transparent portion (the inclined surface 13a or 13b of the trapezoidal projection 13).

In a case where the light ray 4 enters the optical scale 7, being inclined outward at an angle of $\phi$ with respect to the optical axis 6, in other words, in a case where an angle made by the normal of the flat surface (the upper base 13c) and the optical axis 6 of the incident light 4 from the light source 1 is φ, Eq. (3) is changed into Eq. (3a) or (3b) and Eq. (5) is changed into Eq. (5a), (5b), (5c) or (5d), like in the first, second, third and fourth preferred embodiments.

Needless to say, the optical scale 7 may be either a linear type shown in, e.g., FIGS. 3A, 3B or a rotary type shown in, e.g., FIGS. 4A, 4B and 5A, 5B.

The Seventh Preferred Embodiment

In the above preferred embodiments, discussion has been made on the case where the tilt angles of the two inclined surfaces are the same in the optical scale comprising the light non-transparent portion consisting of at least one pair of inclined surfaces which are opposed in such a manner as to become farther away from each other towards the side where the incident light enters. The tilt angles of the two inclined surfaces, however, may be different from each other.

Hereinafter, discussion will be made on the case where the tilt angles of the two inclined surfaces 8a and 8b are different from each other in the optical scale of the first preferred embodiment, and the same applies to any optical encoder shown in the second to sixth preferred embodiments.

In FIG. 2, for example, the tilt angle of one inclined surface 8a with respect to the flat portion 9 (flat surface) is $(45-\alpha)$ degrees and that of the other inclined surface 8b is $(45-\beta)$ degrees, where $\alpha \neq \beta$ $0 < \alpha < 45$ $0 < \beta < 45$ and the refractive index of the optical scale 7 is selected so that the critical angle θc which depends on the difference in refractive index between it and a peripheral portion such as air should be;

$\theta c < 45 - \alpha$ $\theta c < 45 - \beta$

The angle made by the inclined surfaces 8a and 8b is $(90+\alpha+\beta)$ degrees, i.e., $(90+\gamma)$ degrees, where $0 < \gamma < 90$.

The reflected light 10 is reflected twice in the V-shaped projection 8 and after the angle made by the optical axis 6 of the incident light 4 and the reflected light 10 becomes θ, the reflected light 10 is refracted again by the lens 5 and reaches the light source portion (substrate 2), but in the optical encoder of the seventh preferred embodiment, α and β are set so that the reflected light 10 should enter the substrate 2 at a position outside the die pad 3 (the reflected light 10 should not enter the light emitting portion and the reflecting portion such as the die pad 3 or the electrode around the light emitting portion in the light source 1), in other words, $x > w$ (1)

should be satisfied, where x represents a distance between the incident position of the reflected light 10 onto the substrate 2 and the light emitting point of the light source 1 and w represents a distance between an end of the die pad 3 and the light emitting point of the light source 1.

Therefore, the seventh preferred embodiment can produce the same effect as that of the first preferred embodiment.

Though it is assumed in the seventh preferred embodiment that the substrate 2 has a surface in which light is absorbed or scattered and very few light is regularly reflected, however, if the substrate 2 has a high rate of regular reflection like the die pad 3, the above reference sign w represents a distance between an end of a region having a high rate of regular reflection and the light emitting point of the light source 1 instead.

Also in the case where an angle made by the normal of the flat surface (the flat portion 9) and the optical axis 6 of the incident light 4 from the light source 1 is φ, though detailed discussion is omitted, it is obvious that the same effect as that in the first preferred embodiment can be produced even if the tilt angles of the two inclined surfaces 8a and 8b are different from each other.

Further, when the angle made by the inclined surfaces 8a and 8b is $(90+\gamma)$ degrees, in other words, out of 90 degrees, since the reflected light 10 is not parallel with the incident light 4, in the case where at least one of the inclined surfaces 8a and 8b (e.g., the inclined surface 8a) is inclined at an angle of $(45-\alpha)$ degrees or $(45+\alpha)$ degrees with respect to the flat surface and the other inclined surface (e.g., the inclined surface 8b) is inclined at an angle of 45 degrees with respect to the flat surface, or also in the case where one inclined surface (e.g., the inclined surface 8a) is inclined at an angle of $(45-\alpha)$ degrees with respect to the flat surface and the other inclined surface (e.g., the inclined surface 8b) is inclined at an angle of $(45+\beta)$ degrees with respect to the flat surface, by appropriately setting the values of α and β, the construction can be achieved where the incident light entering one inclined surface (any one of the inclined surfaces 8a and 8b) is totally reflected thereon to enter the other inclined surface and at least part of the light is reflected on the other inclined surface and the reflected light 10 reflected on the other inclined surface does not enter the light emitting portion and the reflecting portion (the electrode of the light source 1 (light emitting element) or the die pad 3) around the light emitting portion in the light source 1.

The Eighth Preferred Embodiment

FIG. 11 shows a principal part of an optical encoder in accordance with the eighth preferred embodiment of the present invention, more specifically, is a plan view where the light source portion is viewed from the side of the optical scale.

In general, an electrode 19 is provided on the light source 1 such as an LED or a surface emitting laser diode and supplied with a driving current through a metal wire 21, and a light emitting point 20 emits light. The light source 1 is placed on the die pad 3 on the substrate 2.

Since a metal is generally used as an material of the electrode 19 and the die pad 3 and its reflectance is high as discussed in the first preferred embodiment, the reflected light 10 from the optical scale 7 is reflected again on the electrode 19 or the die pad 3 and this causes the problem in the background art.

In the eighth preferred embodiment, an anti-reflection film 22 (in FIG. 11, for easy understanding, a grid mesh is given), such as a black resist film, which functions to reduce the reflectance is provided on the electrode 19 and the die pad 3. The anti-reflection film 22, however, is not provided near a junction portion between the electrode 19 and the metal wire 21 in order to keep electrical conduction.

The black resist film can be formed as the anti-reflection film 22 with a desired size at a desired position, for example, by applying a black resist through spin coat processing or the like onto a portion on a wafer before dicing, on which a plurality of LEDs are formed, other than the light emitting point, placing a mask with a light shielding portion against exposure light beams, with the same size at the same position as those of the desired anti-reflection film, exposing the wafer and developing it. Likewise, the anti-reflection film 22 can be formed also on the substrate 2.

Such an anti-reflection film 22 can be formed, for example, after the light source 1 provided with the electrode 19 is joined onto the die pad 3 on the substrate 2 and the metal wire 21 is joined to the electrode 19. For example, black ink or the like which is to become the anti-reflection film 22 has only to be applied manually or with a robot. Further, in this case, if the anti-reflection film 22 having the electrical insulation property is used, the portion near the junction portion between the electrode 19 and the metal wire 21 can be also covered with the anti-reflection film 22.

As discussed above, in the eighth preferred embodiment, since at least part of the reflecting portion (the electrode 19 of the light source 1 and the die pad 3) around the light emitting portion of the light source 1 is covered with the anti-reflection film, even if the reflected light reflected on the light non-transparent portion in one track on the optical scale enters the reflecting portion (the electrode 19 and the die pad 3 of the light source 1) around the light emitting portion of the light source 1, most of the reflected light is absorbed by the anti-reflection film 22 and the reflected light hardly reenters the other track or the original track. As a result, it is possible to suppress a detection error caused by reentrance of the light ray reflected on the light non-transparent portion into the other track or the original track.

The anti-reflection film 22 on the die pad 3 may cover not only the die pad 3 but also the entire substrate 2.

Needless to say, the optical scale 7 may be either a linear type shown in, e.g., FIGS. 3A, 3B or a rotary type shown in, e.g., FIGS. 4A, 4B and 5A, 5B.

The eighth preferred embodiment may be performed alone and may be performed together with any one of the first to seventh preferred embodiments at the same time.

When the eighth preferred embodiment is performed alone, this can be applied to not only the case where the light non-transparent portion is constituted of the inclined surfaces but also a case where the light non-transparent portion is formed of an opaque portion such as a chromium layer formed on a transparent substrate such as a glass, and this can suppress an error caused by reentrance of a light ray reflected on the opaque portion such as a chromium layer into an other track or the original track. In order to manufacture the optical scale including the light non-transparent portion formed of the opaque portion, a method of making a slit by etching a metal plate or the like can be used.

The Ninth Preferred Embodiment

FIG. 12 shows a principal part of an optical encoder in accordance with the ninth preferred embodiment of the present invention, more specifically, is a plan view where the light source portion is viewed from the side of the optical scale.

In general, the electrode 19 on the light source 1 such as an LED or a surface emitting laser diode has an area which is sufficiently larger than a contact area between it and the metal wire 21, and the die pad 3 has an area which is several times as large as a contact area between it and the light source 1.

In the ninth preferred embodiment, the areas of the electrode 19 and the die pad 3 are made as small as possible, to become almost equal to the required contact areas with the metal wire 21 and the light source 1, respectively, and an area of the reflecting portion is thereby reduced.

Therefore, the probability that the light ray reflected on the light non-transparent portion in one track on the optical scale should enter the reflecting portion such as the electrode 19 and the die pad 3 of the light source 1 (around the light emitting portion of the light source 1) becomes lower and the reflected light hardly enters the other track or the original track. As a result, it is possible to suppress a detection error caused by reentrance of the light ray reflected on the light non-transparent portion into the other track or the original track.

Further, it is preferable that the area of the die pad 3 should be made larger, uniformly from the periphery of a contact face of the light source 1 with the die pad 3 so as to be larger than the contact area of the light source 1 with the die pad 3. The size is within 100 μm from the periphery of the contact face of the light source 1 with the die pad 3, preferably within 50 μm, and further preferably within 10 μm.

The area of the die pad 3, however, may be equal to the area of the contact face of the light source 1 with the die pad 3 or smaller.

With respect to the electrode 19, though a specific value is hard to define, it may be provided only on one side of the light emitting point 20, not entirely on the light source 1, as shown in FIG. 12.

Both the areas of the electrode 19 and the die pad 3 do not have to be made as small as possible, and a reasonable effect can be produced by reducing at least either of them, for example, by making only the area of the die pad 3 almost equal to the contact area with the light source 1.

Needless to say, the optical scale 7 may be either a linear type shown in, e.g., FIGS. 3A, 3B or a rotary type shown in, e.g., FIGS. 4A, 4B and 5A, 5B.

The ninth preferred embodiment may be performed alone and may be performed together with any one of the first to eighth preferred embodiments at the same time.

When the ninth preferred embodiment is not performed together with any one of the first to seventh preferred embodiments at the same time, this can be applied to not only the case where the light non-transparent portion is constituted of the inclined surfaces but also the case where the light non-transparent portion is formed of the opaque portion such as a chromium layer formed on a transparent substrate such as a glass, and this can suppress an error caused by reentrance of a light ray reflected on the opaque portion such as a chromium layer into an other track or the original track.

The Tenth Preferred Embodiment

Figure 13:
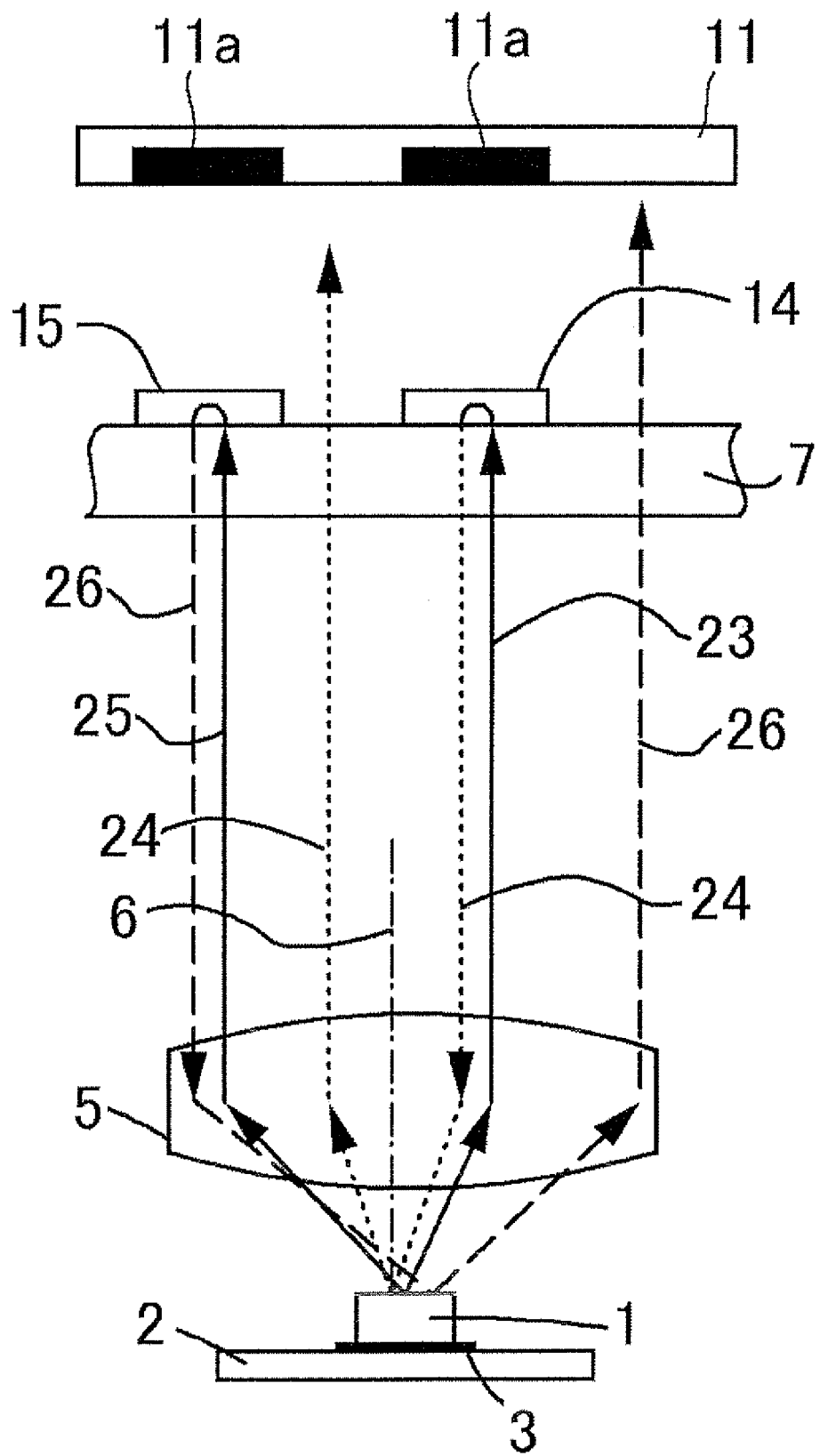
FIG. 13 is a cross section showing a construction of an optical encoder in accordance with a tenth preferred embodiment of the present invention.
Figure 14A:
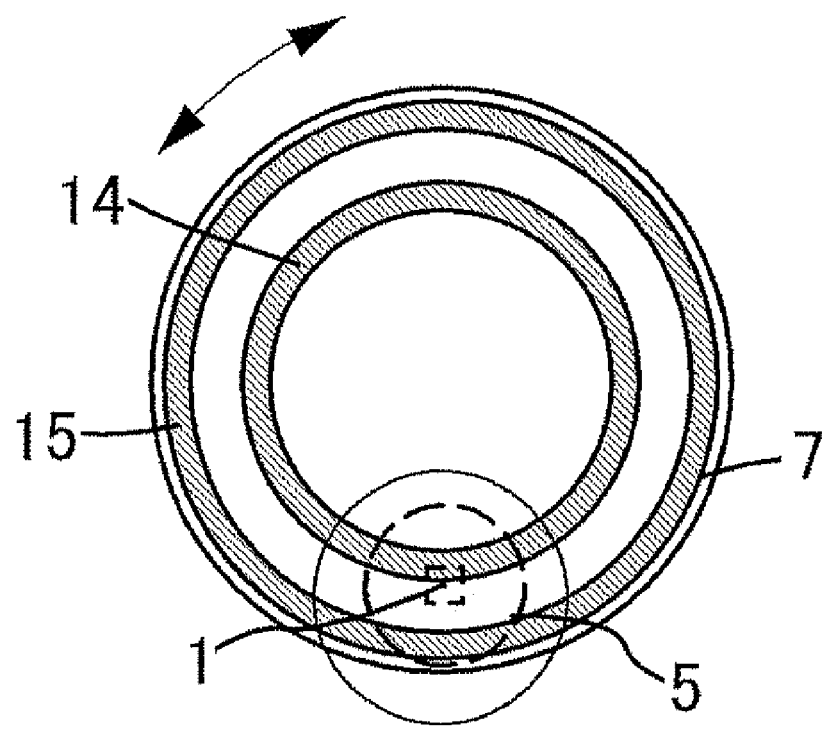
FIGS. 14A and 14B show a construction of the optical encoder in accordance with the tenth preferred embodiment of the present invention.
Figure 14B:
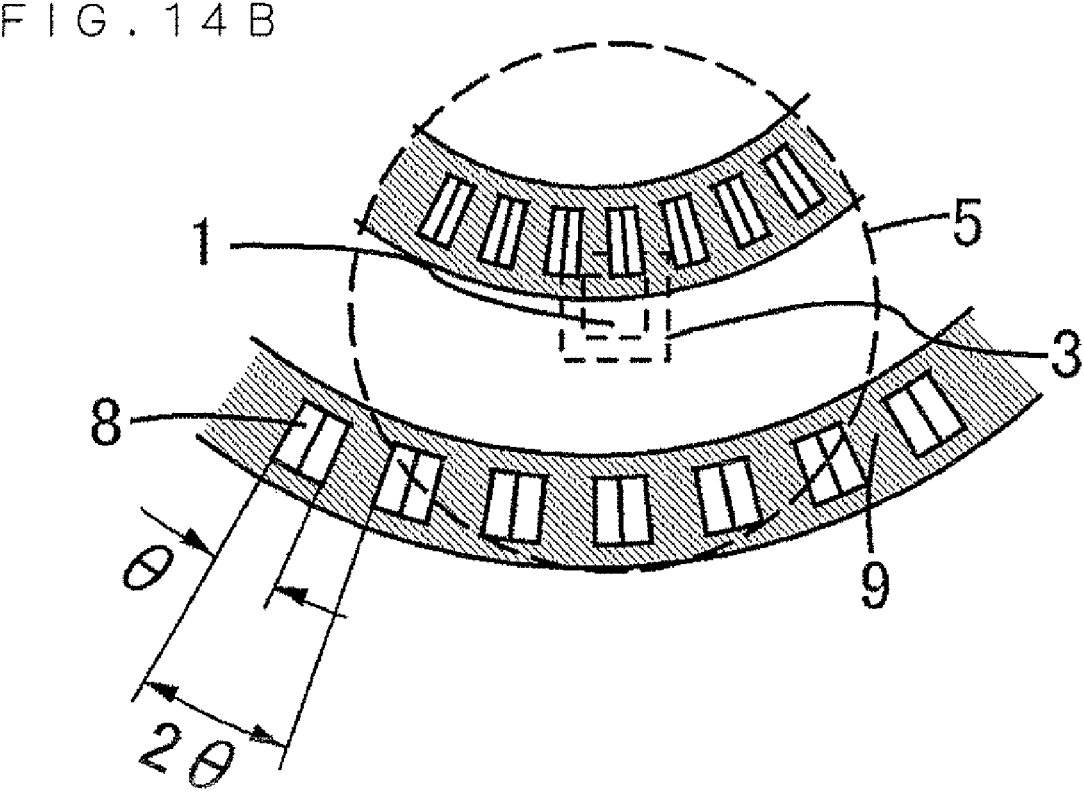

FIGS. 13 and 14A, 14B each show a construction of an optical encoder in accordance with the tenth preferred embodiment of the present invention, and FIG. 13 is a cross section, FIG. 14A is a plan view viewed from the light detecting portion and FIG. 14B is an enlarged plan view showing part (surrounded by a circle) of the construction shown in FIG. 14A.

In the tenth preferred embodiment, it is constructed that a portion of the optical scale 7 which has no track is placed at a position symmetrical to the light non-transparent portion (e.g., the V-shaped projection 8) within an irradiation region of the light ray (incident light) from the light source 1 with respect to the optical axis 6 of the light source 1 as a symmetry axis.

A light ray 23 emitted from the light source 1 is reflected on the light non-transparent portion in a track 14 to become a reflected light 24 and reflected again on the reflecting portion (e.g., an electrode (not shown) on the light source 1) around the light emitting portion in the light source 1 to reenter the optical scale 7, but the position where the reflected light 24 enters has no track and therefore the reentrance does not cause an error. Also in another track 15, likewise, a light ray 25 emitted from the light source 1 is reflected on the light non-transparent portion in the track 15 to become a reflected light 26 and reflected again on the reflecting portion (e.g., the electrode on the light source 1) around the light emitting portion in the light source 1 to reenter the optical scale 7, but the position where the reflected light 26 enters has no track and therefore the reentrance does not cause an error.

Thus, in the tenth preferred embodiment, since it is constructed that a portion of the optical scale 7 which does not have the track 14 or 15 is placed at a position symmetrical to the light non-transparent portion within the irradiation region of the light ray from the light source 1 with respect to the optical axis 6 of the light source 1 as a symmetry axis, even if the light ray 24 reflected on the light non-transparent portion in one track (e.g., the track 14) on the optical scale 7 is reflected again on the reflecting portion (such as the electrode and the die pad 3) around the light emitting portion in the light source 1 to reenter the optical scale, the light ray hardly enters the other track (e.g., the track 15) or the original track (e.g., the track 14). As a result, it is possible to suppress a detection error caused by reentrance of the light rays 24 and 26 reflected on the light non-transparent portion into the other track or the original track.

Though FIGS. 14A and 14B show the case where the optical scale 7 is a rotary type and the top of the V-shaped projection 8 is extended along a direction of the radius of the optical scale 7, the tenth preferred embodiment is not limited to this case but may be a case where the top of the V-shaped projection 8 is extended to be parallel with the traveling direction of the optical scale 7 as shown in, e.g., FIG. 5B, and needless to say, the optical scale 7 may be a linear type shown in, e.g., FIGS. 3A and 3B.

The tenth preferred embodiment may be performed alone and may be performed together with any one of the first to ninth preferred embodiments at the same time.

When the tenth preferred embodiment is not performed together with any one of the first to seventh preferred embodiments at the same time, this can be applied to not only the case where the light non-transparent portion is constituted of the inclined surfaces but also the case where the light non-transparent portion is formed of the opaque portion such as a chromium layer formed on a transparent substrate such as a glass, and this can suppress an error caused by reentrance of the light ray reflected on the opaque portion such as a chromium layer into the other track or the original track.

The invention claimed is:

1. An optical encoder comprising:
   an optical scale having at least one track in which a light transmission portion and a light non-transparent portion are arranged, where an output pattern obtained by emitting an incident light functions as an optical code;
   a light source portion including at least one light source for emitting said incident light; and
   a light detecting portion including at least one light detecting element for detecting said output pattern,
   wherein a portion of said optical scale which has no track is placed at a position symmetrical to said light non-transparent portion within an irradiation region of said incident light from said light source with respect to an optical axis of said light source as a symmetry axis.

* * * * *